(12) United States Patent
Goetzke et al.

(10) Patent No.: US 11,669,802 B2
(45) Date of Patent: Jun. 6, 2023

(54) PERFORMANCE MONITORING INTERFACES FOR WAREHOUSE OPERATIONS

(71) Applicant: Target Brands, Inc., Minneapolis, MN (US)

(72) Inventors: Dan Goetzke, Minneapolis, MN (US); Michael Rorro, Minneapolis, MN (US); Alexander J. Meyer, Minneapolis, MN (US); Chuong Bui, Minneapolis, MN (US); Mike Parker, Minneapolis, MN (US); Allison Ewald, Minneapolis, MN (US); Cory Norell, Minneapolis, MN (US); Margaret Casey, Minneapolis, MN (US); Christopher Swenson, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 193 days.

(21) Appl. No.: 17/195,315

(22) Filed: Mar. 8, 2021

(65) Prior Publication Data

US 2022/0284380 A1    Sep. 8, 2022

(51) Int. Cl.
*G06Q 10/087* (2023.01)
*G06Q 10/0639* (2023.01)
*G06Q 10/0631* (2023.01)

(52) U.S. Cl.
CPC ..... *G06Q 10/087* (2013.01); *G06Q 10/06316* (2013.01); *G06Q 10/06398* (2013.01)

(58) Field of Classification Search
CPC ........... G06Q 10/087; G06Q 10/06316; G06Q 10/06398
See application file for complete search history.

(56) References Cited

U.S. PATENT DOCUMENTS 10,643,157 B2    5/2020  De et al.
2003/0171962 A1  9/2003  Hirth et al.
(Continued)

FOREIGN PATENT DOCUMENTS

WO    WO2014008307    1/2014

OTHER PUBLICATIONS

Mario Amorim Lopes et al. (Jul. 2020) Improving picking performance at a large retailer warehouse by combining probabilistic simulation, optimization, and discrete-event simulation. (Year: 2020).*

(Continued)

*Primary Examiner* — Peter Ludwig
(74) *Attorney, Agent, or Firm* — Barnes & Thornburg LLP

(57) ABSTRACT

A warehouse coordination system performs a simulation of tasks to be performed over a shift for a warehouse process, according to a defined sequence of the tasks and defined resources to be applied to the tasks, and generates simulation output data. The warehouse coordination system stores data that represents the defined sequence of the tasks, data that represents the defined resources to be applied to the tasks, and the simulation output data. The warehouse coordination system receives real-time warehouse data that indicates tasks being performed over the shift. The warehouse coordination system provides data for a performance monitoring interface, and the performance monitoring interface presents, for a plurality of time periods, an amount of tasks that have been predicted to be performed according to the simulation of the tasks, in comparison to an amount of tasks that have been performed according to the real-time warehouse data.

19 Claims, 14 Drawing Sheets

(56) References Cited

U.S. PATENT DOCUMENTS

| | | | |
|---|---|---|---|
| 2004/0267591 A1 | 12/2004 | Hedlund et al. | |
| 2007/0162435 A1 | 7/2007 | Hadari et al. | |
| 2009/0006164 A1 | 1/2009 | Kaiser et al. | |
| 2014/0279660 A1 | 9/2014 | Santavicca et al. | |
| 2016/0314424 A1* | 10/2016 | High | G06Q 10/1095 |
| 2018/0068255 A1* | 3/2018 | Hance | G06Q 10/087 |
| 2018/0107961 A1 | 4/2018 | Kiuchi et al. | |
| 2018/0293527 A1 | 10/2018 | Amirjalayer et al. | |
| 2021/0349473 A1* | 11/2021 | Akiona | G05B 13/04 |
| 2022/0051184 A1* | 2/2022 | Cella | G06N 3/0427 |

OTHER PUBLICATIONS

K Agalianos et al. (2020). Discrete event simulation and digital twins: review and challenges for logictics. Science Direct.*

P Ribino et al. (2016). Agent based simulation study for improving logistic warehouse performance.*

AnyLogic.com [online], "Features—AnyLogic Simulation Software," Mar. 30, 2018, retrieved on or before Mar. 8, 2021, retrieved from URL: <https://help.anylogic.com/index.jsp>, 7 pages.

AnyLogic.com [online], "Modeling Approaches," Mar. 30, 2018, retrieved on or before Mar. 8, 2021, retrieved from URL: <https://help.anylogic.com/index.jsp>, 16 pages.

AnyLogic.com [online], "Tutorials: Supply Chain GIS (Agent-based)," Mar. 30, 2018, retrieved on or before Mar. 8, 2021, retrieved from URL: <https://help.anylogic.com/indexjsp>, 33 pages.

Irms360 [online], "irms360 Cloud Warehouse Management System," Jun. 4, 2020, retrieved on or before Mar. 8, 2021, retrieved from URL: <https://www.irms360.com/product/irms-cloud-wms>, 3 pages.

Omnna [online] "Inventory Management," dated 2020, retrieved on or before Mar. 8, 2021, retrieved from URL: <https://www.omnna.com/inventorymanagementsoftware/>, 8 pages.

Oracle [online], "Task Management," dated 2020, retrieved on or before Mar. 8, 2021, retrieved from URL: <https://docs.oracle.com/cd/E18727_01/doc.121/e13433/T211976T430466.htm>, 36 pages.

Oracle [online], "Wave Planning," dated 2020, retrieved on or before Mar. 8, 2021, retrieved from URL: <https://docs.oracle.com/cd/E18727_01/doc.121/e13433/T211976T536591.htm>, 31 pages.

SAP [online], "Warehouse Management System," dated Jun. 4, 2020, retrieved on or before Mar. 8, 2021, retrieved from URL: <https://help.sap.com/viewer/34fc810a607e4ae5a287b6e233b8566f/6.17.17/en-US>, 109 pages.

Skulocity [online], "Production Planning," dated Jun. 3, 2020, retreived on or before Mar. 8, 2021, retrieved from URL: www.skulocity.com/production-planning/, 6 pages.

\* cited by examiner

FIG. 6B

PERFORMANCE MONITORING INTERFACES FOR WAREHOUSE OPERATIONS

TECHNICAL FIELD

This specification generally relates to a platform that includes integrated planning, simulation, and reporting tools, for coordinating warehouse operations, such as processes for distributing physical items from a warehouse to a store.

BACKGROUND

Warehouse management systems (WMS) can perform a variety of operations to manage the physical distribution of goods in and out of warehouses. For example, a WMS can receive orders to be distributed from a warehouse and can translate those orders into specific warehouse operations, such as selecting particular pallets from locations in the warehouse and loading them onto trucks for distribution. WMS systems have traditionally been designed to focus on processing orders within the warehouse. For example, a WMS may simply identify operations that are needed to fulfill an order and send those out to be performed by the next available resource within the warehouse (e.g., send out instructions to forklift operator).

Simulation modeling platforms have been used to facilitate simulation modeling for various business and industrial processes. Within the simulation platforms, users may develop custom models for discrete elements (e.g., processes and agents), and may define interactions between the elements. By performing simulations, for example, experiments may be conducted to determine how randomness and parameter changes affect model behavior. Simulation results may be analyzed and changes may be made based on the analysis to improve the business and industrial processes.

SUMMARY

This document generally describes computer systems, processes, program products, and devices for providing a platform that includes integrated planning, simulation, and reporting tools, for coordinating warehouse operations among multiple different groups/teams within a warehouse. For example, a warehouse may include multiple different teams who are assigned a specific set of tasks, such as a team receiving inbound shipments (e.g., unloading pallets from trucks arriving at warehouse), another team handling storage and retrieval operations (e.g., moving pallets in and around the warehouse), another team handling sortation operations (e.g., breaking apart goods on pallets and packing pallets using goods from different pallets), and another team performing shipping operations (e.g., assembling and loading outbound pallets onto trucks for distribution to retail stores). For efficiency, workers in a warehouse can be assigned to different teams to distribute the labor and operations that are performed. However, unharmonious workflow between the different teams in the warehouse can create inefficiencies because the operations that are performed among teams within a warehouse are linked to each other. For example, a receiving team working too quickly to unload inbound trucks to a warehouse can create a backlog of pallets in the dock area of the warehouse, which then makes the operations performed by a storage and retrieval team and/or a shipping team less efficient. Similarly, under-utilized labor on the receiving team can degrade the productivity of the storage and retrieval team and/or the sortation team even though those teams may have the capacity to work at a faster pace.

The disclosed technology provides solutions to these problems by generating plans that provide for harmonious coordination among teams within a warehouse that take into account relationships among teams to provide for improved efficiency for the warehouse and its teams as a whole, instead of simply for each team individually. For example, the disclosed technology provides a warehouse operation coordination platform that includes labor and production planning tools for generating and simulating detailed work plans at the team level (e.g., receiving, storage and retrieval, sortation, and shipping), and performance monitoring tools for monitoring various performance metrics (e.g., productivity, throughput, safety, etc.), across multiple teams to provide for a more efficient overall operation with coordination among the multiple teams. For instance, the disclosed technology can generate plans for each team, including the allocation of workers among the teams, that are easy to follow and that provide for synchronization among the multiple teams so that one team is not working too far ahead of or behind of other teams and thus injecting inefficiencies into the system. The end result is a plan that, when followed by each team, provides an efficient and balanced outcome for the warehouse as a whole (e.g., maximize throughput of pallets through warehouse) even though it may require one or more team to work at a pace that is below their maximum output.

The disclosed performance monitoring tools can additionally provide for and facilitate the generation of integrated performance monitoring user interfaces. The performance monitoring interfaces, for example, can integrate plan simulation data, real-time work task data, and observation data, to facilitate collaboration among different teams within a warehouse in order to provide balance and harmony between the teams and to improve overall efficiency under a production plan. The user interface features can include work plan information according to a simulated work plan that team leaders are instructed to follow, along with variances indicating acceptable ranges of actual production output relative to simulated production output. The interface can also provide alerts prompting team leaders for feedback and observations with respect to work tasks being performed by their team, when actual production deviates from planned production. Additionally, the interface can prompt collaborative check-ins among team leaders throughout a work shift, which can facilitate adjustments and modifications to each team's performance during the shift. By providing each operations manager in a warehouse environment with a respective performance monitoring interface that aggregates and simplifies complex data that pertains to their respective team, for example, the operations managers can more effectively focus on their respective objectives, which may be to produce according to the performance goals for their team (instead of always a maximum amount), in order to improve efficiency for the warehouse as a whole.

In some implementations, a method performed by data processing apparatuses includes performing, by a warehouse coordination system, a simulation of tasks to be performed over a shift for a warehouse process, according to a defined sequence of the tasks and defined resources to be applied to the tasks; generating, by the warehouse coordination system, simulation output data based on the simulation of the tasks to be performed; storing, by the warehouse coordination system, data that represents the defined sequence of the tasks to be performed, data that represents the defined resources to be applied to the tasks, and the simulation output data based on the simulation of the tasks to be performed; receiving, by the warehouse coordination system, real-time warehouse data that indicates tasks being performed over the shift for the warehouse process; and providing, by the warehouse coordination system, data for a performance monitoring interface for the warehouse process, wherein the performance monitoring interface presents, for each time period of a plurality of time periods, an amount of tasks that have been predicted to be performed according to the simulation of the tasks, in comparison to an amount of tasks that have been performed according to the real-time warehouse data.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. Performing the simulation of tasks to be performed over the shift for the warehouse process can include modeling the tasks to be performed according to an assigned sequence of tasks over time, using a collection of state variables that represent workers and containers in a warehouse. The real-time warehouse data can include one or more identifiers for a task that has been performed, and a timestamp that indicates a time at which the task has been performed. The performance monitoring interface can include a first graphical indicator that plots, along a time axis, a cumulative amount of tasks that have been predicted to be performed according to the simulation of tasks, and a second graphical indicator that plots, along the time axis, a cumulative amount of tasks that have been performed according to the real-time warehouse data. The first graphical indicator can represent a predetermined variance for the cumulative amount of tasks that have been predicted to be performed according to the simulation of tasks. The performance monitoring interface can present an alert when the amount of tasks that have been performed according to the real-time warehouse data is outside of a predetermined variance for the amount of tasks that have been predicted to be performed according to the simulation of tasks. The performance monitoring interface can provide an input mechanism for providing operator information when the amount of tasks that have been performed according to the real-time warehouse data is outside of the predetermined variance for the amount of tasks that have been predicted to be performed according to the simulation of tasks.

The systems, devices, program products, and processes described throughout this document can, in some instances, provide one or more of the following advantages. Data from warehouse management systems (WMS) and performance tracking systems can be ingested, enhanced, and stored, such that processes for generating work plans can execute without burdening the WMS and performance tracking systems, conserving system resources. A workflow can be provided that deepens understanding of both operations and planning processes, providing transparency to plan details while automating manual data sourcing and input. Feasible and integrated work plans can be efficiently generated. Planning simulation tools can be used to test process improvement and/or physical layout changes in a warehouse before the changes are implemented, facilitating process and layout improvements. Work plans can be based on a low level of available detail to produce a high level of output precision. Work plans for multiple different teams can be coordinated with a shared set of priorities among the teams, increasing production efficiencies throughout a warehouse. Planning processes can be standardized across warehouses that have similar operational structures. A consistent user experience can be delivered through a standardized set of tools, increasing collaboration between teams during a common planning process, and improving in-depth understanding of holistic operations by managers and higher-level leadership.

Other features, aspects and potential advantages will be apparent from the accompanying description and figures.

DESCRIPTION OF DRAWINGS

FIG. 6A-C depict example performance monitoring interfaces for receiving operations.

Like reference symbols in the various drawings indicate like elements

DETAILED DESCRIPTION

This document describes technology that can coordinate warehouse operations through the use of integrated planning, simulation, and reporting tools. In general, warehouse operations managers (e.g., leaders of various warehouse teams, such as receiving, storage and retrieval, sortation, and shipping teams) may lack specific tools for creating detailed production plans and for monitoring holistic warehouse performance. For example, using manual techniques and/or ad hoc tools, a warehouse operations manager may spend several hours over the course of a shift collecting and organizing data from multiple different sources to create a production plan for their team and track team performance according to the plan. Further, a production plan created for a team through manual data aggregation and production planning techniques may be difficult to coordinate with production plans created for other teams. For example, a receiving team may be responsible for receiving goods delivered to a warehouse (e.g., unloading cartons from a truck), and a storage and retrieval team may be responsible for storing those goods in the warehouse (e.g., delivering cartons to specific warehouse locations). If production plans for the receiving team and the storage and retrieval team are independently created, for example, a production plan for the receiving team may specify that the team is to receive more goods than the storage and retrieval team is capable of storing, resulting in production inefficiencies throughout the warehouse.

The warehouse operation coordination platform described in this document includes labor and production planning tools for generating detailed work plans for warehouses at the team level (e.g., receiving, storage and retrieval, sortation, and shipping), across multiple teams. The platform also includes reporting tools for providing real-time information about work progress with respect to the generated plans, such that work across the various teams can be better coordinated, and production staffing needs can be shifted when appropriate. At a high level, the platform has three main components: a data ingestion component that receives relevant data from warehouse management systems (WMS) and performance tracking systems used to generate the work plans, a plan creation tool through which operation managers can generate and simulate plans for their portion of the warehouse, and a performance monitoring tool that provides work progress information to each of the operation managers to promote collaboration between the teams.

Figure 1A:
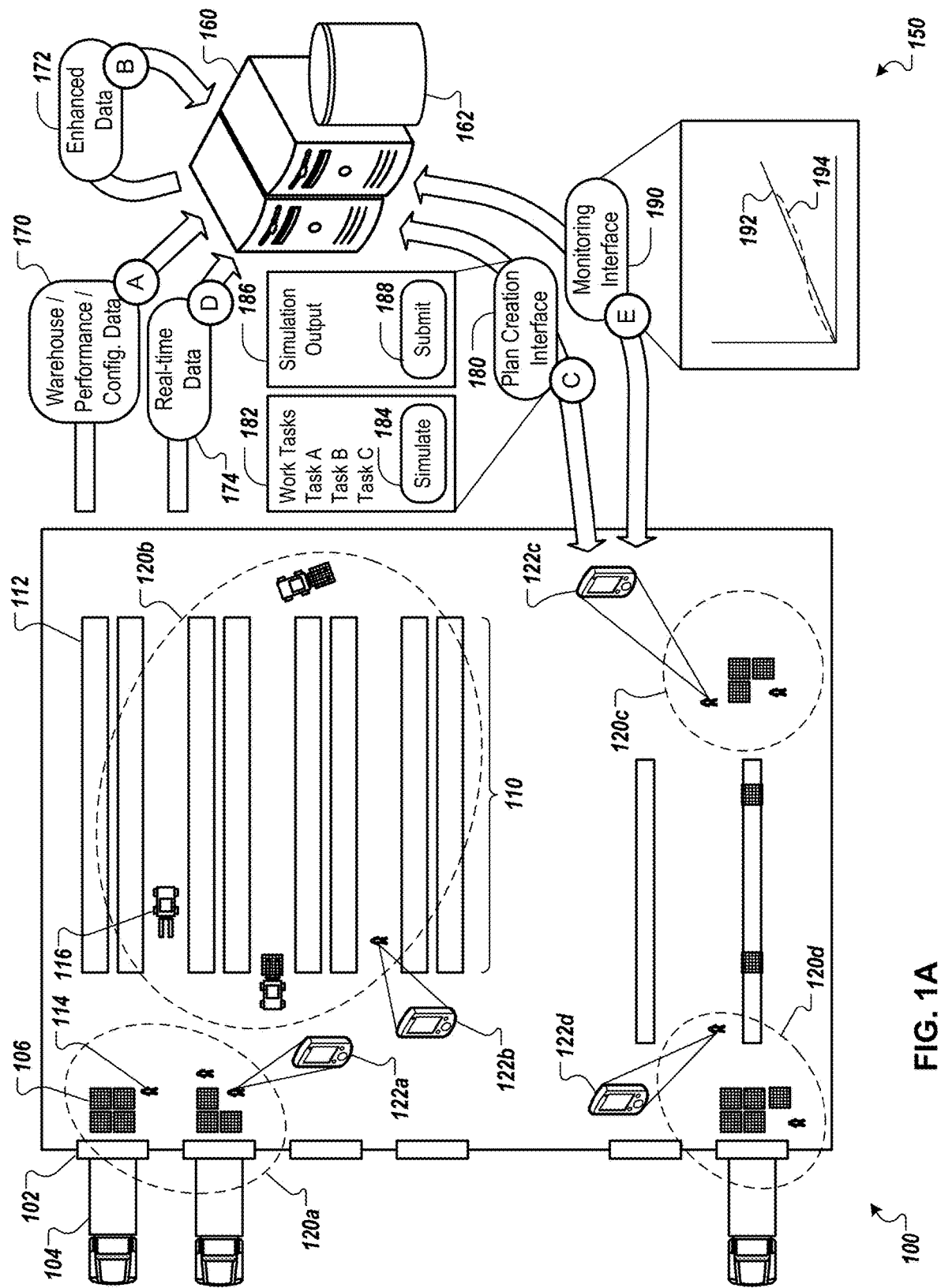
FIG. 1A is a conceptual drawing of an example warehouse environment, and an example system for generating warehouse process plans and coordinating warehouse operations.

FIG. 1A is a conceptual diagram of an example warehouse environment 100, and an example system 150 for generating warehouse process plans and coordinating warehouse operations, as represented in example stages (A) to (E). Stages (A) to (E) may occur in the illustrated sequence, or they may occur in a sequence that is different than in the illustrated sequence, and/or two or more stages (A) to (E) may be concurrent. In some examples, one or more stages (A) to (E) may be repeated multiple times during a warehouse shift.

The warehouse environment 100 can be a storage warehouse, a packing warehouse, a retail warehouse, a distribution center, or another sort of warehouse or facility, for example. In the present example, the warehouse environment 100 includes multiple docks 102 at which vehicles 104 (e.g., trucks) can be loaded and/or unloaded with various containers 106 (e.g., pallets, boxes, etc., containing various goods). The warehouse environment 100 in the present example also includes a storage area 110, which can include various storage racks 112 which can be arranged in rows and/or columns and configured to store the containers 106 in different levels. For example, elevators and/or rack conveyor belts may be used to elevate the containers 106 to different levels and move them to and from desired locations in the storage racks 112. Various workers 114 and equipment 116 (e.g., forklifts, pallet jacks, automated guided vehicles (AGVs), etc.) can be employed in the warehouse environment 100, for example, to perform various warehouse tasks.

In general, workers and equipment may be organized into different teams, each team performing a different sort of task in the warehouse environment. For example, a receiving team 120a can include workers 114 and/or equipment 116 for performing various receiving tasks, such as unloading containers 106 from vehicles 104. A storage and retrieval team 120b, for example, can include workers 114 and/or equipment 116 for performing various storage and/or retrieval tasks, such as moving the containers 106 throughout the warehouse environment 100, placing the containers 106 in the storage racks 112, and removing the containers 106 from the storage racks 112. A sortation team 120c, for example, can include workers 114 and/or equipment 116 for performing various sortation tasks, such as breaking apart containers 106 of goods and/or repackaging goods into different containers 106. A shipping team 120d, for example, can include workers 114 and/or equipment 116 for performing various shipping tasks, such as loading containers 106 into outbound vehicles 104 for transportation to other locations (e.g., warehouses, distribution centers, stores, customer locations, etc.).

In general, each team may include and/or be directed by one or more operations managers that use computer applications running on computing devices to create work plans for their team (e.g., a work plan that specifies work to be performed by the team during a shift), and to monitor the progress of the team according to the work plan (e.g., over the course of the shift). For example, an operations manager of the receiving team 120a can use computing device 122a, an operations manager of the storage and retrieval team 120b can use computing device 122b, an operations manager of the sortation team 120c can use computing device 122c, and an operations manager of the shipping team 120d can use computing device 122d. Each of the computing devices 122a-d, for example, can be various forms of stationary or mobile processing devices including, but not limited to a desktop computer, a laptop computer, a tablet computer, a personal digital assistant (PDA), a smartphone, or other processing devices.

Figure 1B:
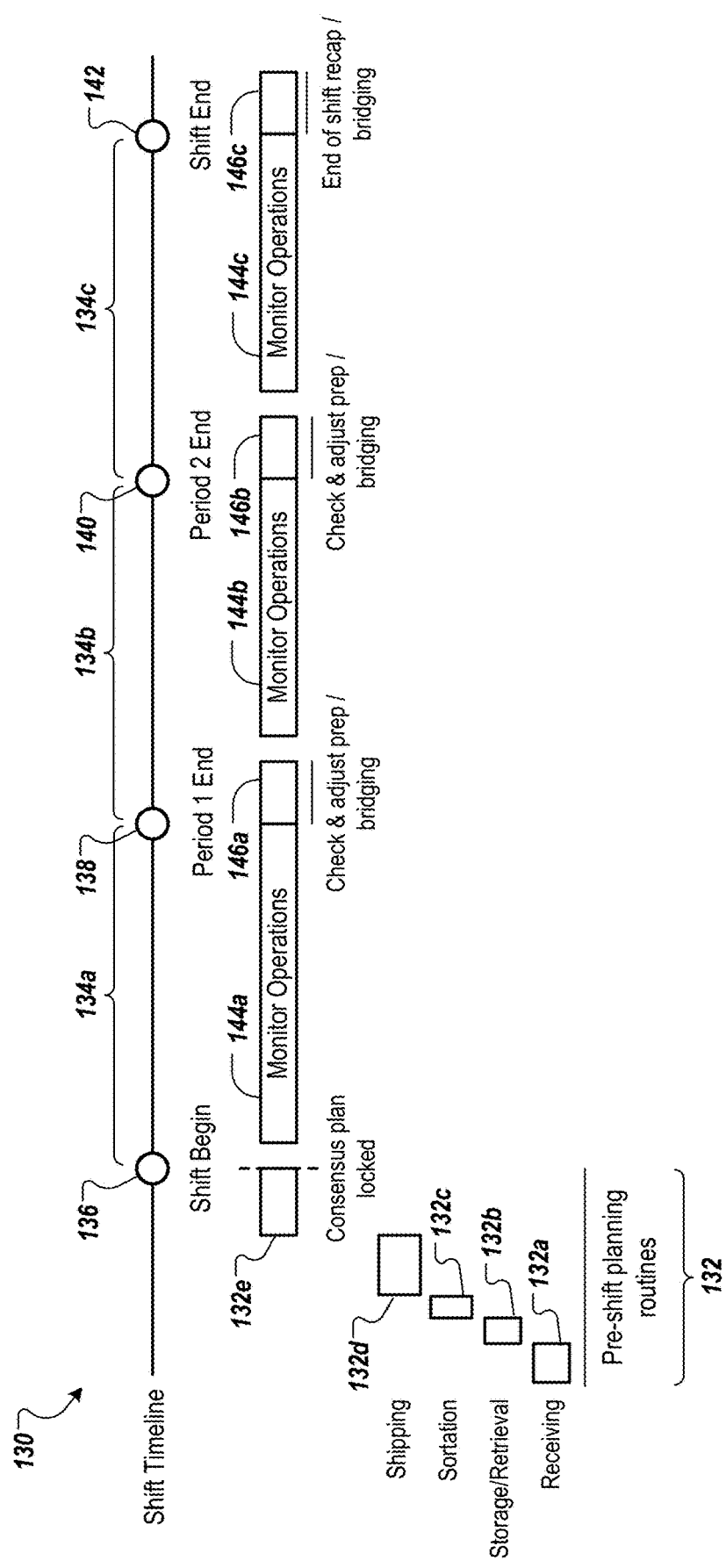
FIG. 1B shows an example shift timeline for warehouse operations.

Referring now to FIG. 1B, an example shift timeline 130 is shown for warehouse operations. A warehouse shift, for example, can be a defined time period (e.g., six hours, eight hours, twelve hours, or another suitable time period) over which various teams (e.g., teams 120a-d, shown in FIG. 1A) perform various operations in a warehouse environment (e.g., warehouse environment 100, also shown in FIG. 1A). In general, warehouse shifts may be divided into multiple different periods having defined start and end times (e.g., organized around breaks). In the present example, the shift timeline 130 includes a pre-shift period 132 during which pre-shift planning routines are performed, and multiple shift periods during which shift operations are performed. A first shift period 134a, for example, begins at time point 136 (e.g., the beginning of the warehouse shift) and ends at time point 138 (e.g., the start of the first break). A second shift period 134b, for example, begins at time point 138 and ends at time point 140 (e.g., the start of the second break). A third shift period 134c, for example, begins at time point 140 and ends at time point 142 (e.g., the end of the warehouse shift).

During the pre-shift period 132, for example, operations managers of various teams (e.g., teams 120a-d, shown in FIG. 1A) can use computing devices (e.g., computing devices 122a-d, also shown in FIG. 1A) to create work plans for their respective teams for the warehouse shift. In the present example, computing device 122a can be used during pre-shift period 132a to create a work plan for the receiving team 120a, computing device 122b can be used during pre-shift period 132b to create a work plan for the storage and retrieval team 120b, computing device 122c can be used during pre-shift period 132c to create a work plan for the sortation team 120c, and computing device 122d can be used during pre-shift period 132d to create a work plan for the shipping team 120d. During pre-shift period 132e, for example, the work plans generated during pre-shift periods 132a-d can be adjusted and aligned by the operations managers of the various different teams 120a-d, such that a consensus plan is locked when the shift begins at time point 136. Example interfaces for creating work plans are described in further detail below. In some implementations, data corresponding to a work plan for a team may be used as input for creating a work plan for another team. For example, data corresponding to a work plan for the receiving team 120a can be used as input for creating a work plan for the storage and retrieval team 120b, data corresponding to a work plan for the storage and retrieval team 120b can be used as input for creating a work plan for the sortation team 120c, and data corresponding to a work plan for the sortation team 120c can be used as input for creating a work plan for the shipping team 120d.

During the warehouse shift (e.g., during an operations monitoring period 144a of the first shift period 134a, an operations monitoring period 144b of the second shift period 134b, and an operations monitoring period 144c of the third shift period 134c), for example, operations performed by various teams (e.g., teams 120a-d, shown in FIG. 1A) can be monitored. In the present example, real-time data that pertains to operations performed by the receiving team 120a in the warehouse environment 100 (shown in FIG. 1A) can be collected (e.g., by data collection devices, such as manual input devices, scanners, cameras, or other suitable devices in the warehouse environment 100), and used to determine progress of the receiving team 120a relative to its work plan for the shift. Similarly, in the present example, real-time data that pertains to operations performed by each of the storage and retrieval team 120b, the sortation team 120c, and the shipping team 120d, can be collected and used to determine progress of the respective team relative to its corresponding work plan for the shift. In general, information related to progress relative to a work plan can be provided to each of the computing devices 122a-d (shown in FIG. 1A) for review by operations managers of the respective teams 120a-d. For example, computing device 122a can be used to present performance monitoring information for the receiving team 120a, computing device 122b can be used to present performance monitoring information for the storage and retrieval team 120b, computing device 122c can be used to present performance monitoring information for the sortation team 120c, and computing device 122d can be used to present performance monitoring information for the shipping team 120d. In some implementations, a different interface may be provided for presenting performance monitoring information for each different team. Example interfaces for presenting performance monitoring information are described in further detail below.

During and/or after the warehouse shift, for example, operations managers of various teams (e.g., teams 120a-d, shown in FIG. 1A) can use computing devices (e.g., computing devices 122a-d, also shown in FIG. 1A) to provide information regarding tasks being performed by their respective teams, and can adjust team resources (e.g., workers 114 and/or equipment 116, also shown in FIG. 1A) based on performance monitoring information presented by the computing devices, such that each of the various teams proceeds according to their respective plan. For example, during check & adjust period 146a at the end of the first shift period 134a, and during check & adjust period 146b at the end of the second shift period 134b, an operations manager of the receiving team 120a, an operations manager of the storage and retrieval team 120b, an operations manager of the sortation team 120c, and an operations manager of the shipping team 120d can provide team updates with respect to their various plans using their respective computing devices 122a-d, and can compare work progress with respect to their respective work plans. In general, team resources allocated to an overproducing team may be shifted to an underproducing team. For example, at the check & adjust period 146a, if the receiving team 120a is identified as having overproduced and the storage and retrieval team 120b is identified has having underproduced during the first shift period 134a, team resources may be shifted from the receiving team 120a to the storage and retrieval team 120b. In the present example, by re-allocating resources among teams during the shift, the production of each team 120a-d can better align with their respective work plan for the shift, thus improving coordination among the teams and increasing overall production throughout the warehouse environment 100. During an end of shift recap period 146c, for example, operations managers of the teams 120a-d can use performance monitoring information presented by the computing devices 122a-d to evaluate overall performance of the teams with respect to their plans, to identify root causes of problems that may have occurred during the shift, and to potentially improve various warehouse processes.

Referring again to FIG. 1A, for example, the system 150 for generating warehouse process plans and coordinating warehouse operations can include various computing servers 160 and data sources 162. In some examples, the computing servers 160 can represent various forms of servers, including but not limited to network servers, web servers, application servers, or other suitable computing servers. In some examples, the data sources 162 can represent databases, file systems, and/or cached data sources. The computing servers 160, for example, can access data from the data sources 162, can execute software that processes the accessed data, and can provide information based on the accessed data to the computing devices 122a-d. Communications between the computing servers 160, the computing devices 122a-d, and various data collection devices (not shown) in the warehouse environment 100, for example, can occur over one or more communication networks (not shown), including a LAN (local area network), a WAN (wide area network), and/or the Internet. In the present example, the computing servers 160 and the data sources 162 can be used to implement a warehouse coordination system, which is described in further detail with respect to FIG. 2.

Figure 2:
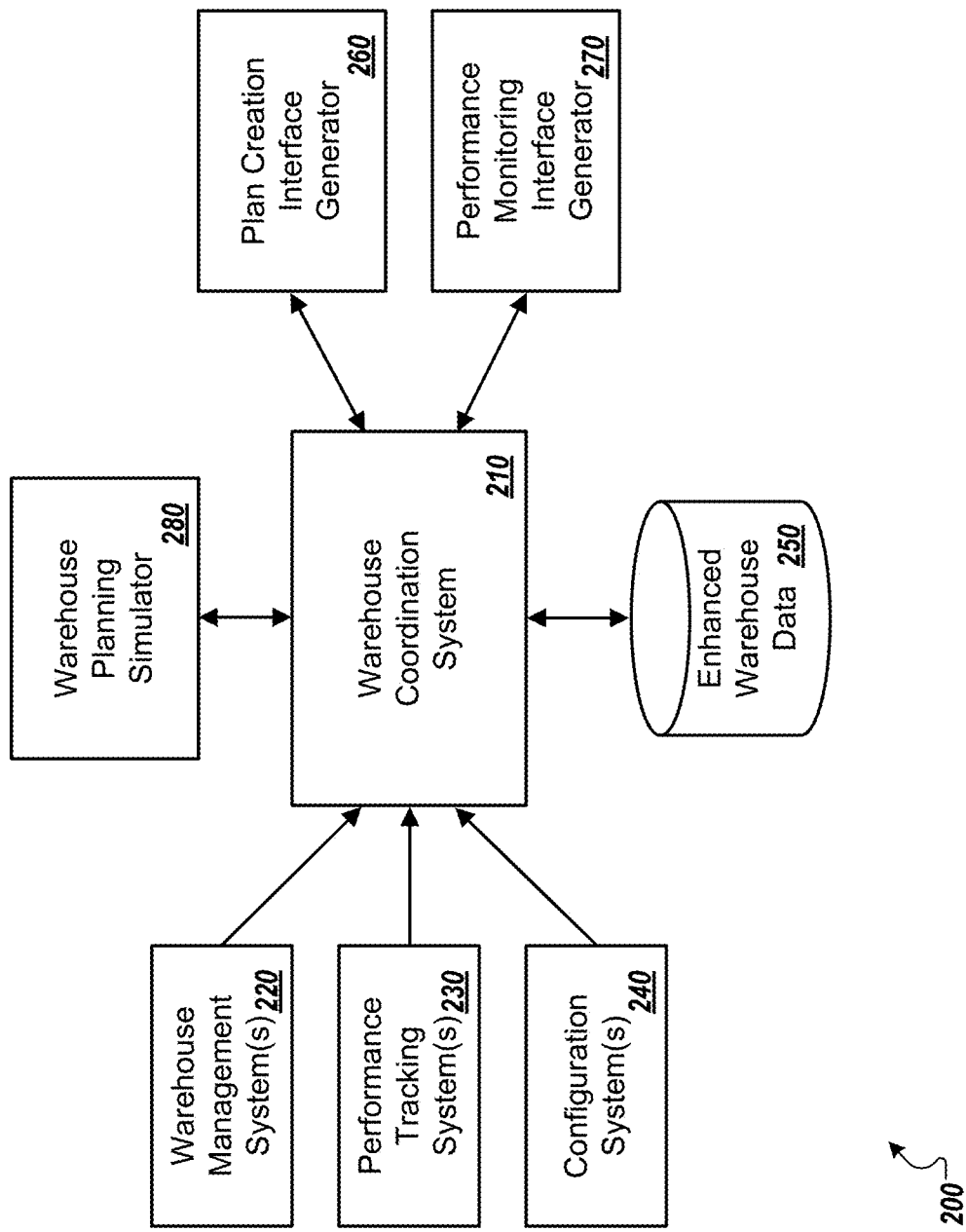
FIG. 2 depicts an example system for generating warehouse process plans and coordinating warehouse operations.

Referring now to FIG. 2, an example system 200 for generating warehouse process plans and coordinating warehouse operations is depicted. The system 200 in the present example includes a warehouse coordination system 210 that receives data (e.g., using a data collection component) from one or more warehouse management systems 220, performance tracking systems 230, and configuration systems 240. The warehouse management system(s) 220, for example, can provide real-time information related to a state of the warehouse environment 100 (shown in FIG. 1A). For example, the warehouse management system(s) 220 can provide information related to containers of goods that have been received and are waiting to be placed in the storage area 110 (shown in FIG. 1A). As another example, the warehouse management system(s) 220 can provide information related to requests for goods that are to be picked from the storage area 110 and that are to be loaded into containers 106 (shown in FIG. 1A) and sent to a retail store. As containers 106 and/or goods in the warehouse environment 100 are involved in a warehouse operation (e.g., receipt, transport, put away, pick, sort, repackage, ship, etc.), for example, real-time operation data (e.g., including an operation timestamp and various identifiers related to the operation, such as location, worker, team, equipment, container, and/or goods identifiers), can be collected and stored by the warehouse management system(s) 220. The performance tracking system(s) 230, for example, can maintain and provide data related to historical performance of various warehouse equipment, workers, and/or teams. For example, the performance tracking system(s) 230 can provide data that indicates productivity rates (e.g., a number of warehouse operations per time period over a defined time range, such as over a previous week, month, quarter, etc.) of warehouse equipment, workers, and/or teams, such that productivity of current combinations of equipment, workers, and/or teams can be projected over a current shift. The configuration system(s) 240, for example, can maintain and provide data related to a configuration (e.g., physical layout, processing capabilities, available equipment, etc.) of the warehouse environment 100. Data received from the warehouse management system(s) 220, the performance tracking system(s) 230, and/or the configuration system(s) 240, for example, can be combined and stored in an enhanced warehouse data source 250 for use by the warehouse coordination system 210.

In the present example, the warehouse coordination system 210 can include and/or communicate with a plan creation interface generator 260, a performance monitoring interface generator 270, and a warehouse planning simulator 280. The plan creation interface generator 260, for example, can be used by the warehouse coordination system 210 to generate respective plan creation interfaces for presentation on each of the computing devices 122*a*-*d* (shown in FIG. 1A) when requested during the pre-shift period 132 (shown in FIG. 1B). The performance monitoring interface generator 270, for example, can be used by the warehouse coordination system 210 to generate respective performance monitoring interfaces for presentation on each of the computing devices 122*a*-*d* when requested during any of the shift periods 134*a*-*c* and/or during the end of shift recap period 146*c* (shown in FIG. 1B). The warehouse planning simulator 280, for example, can be used by the warehouse coordination system 210 (e.g., as part of a plan creation process) to run granular, discrete process simulations for operations to be performed by a team during a shift.

Figure 3:
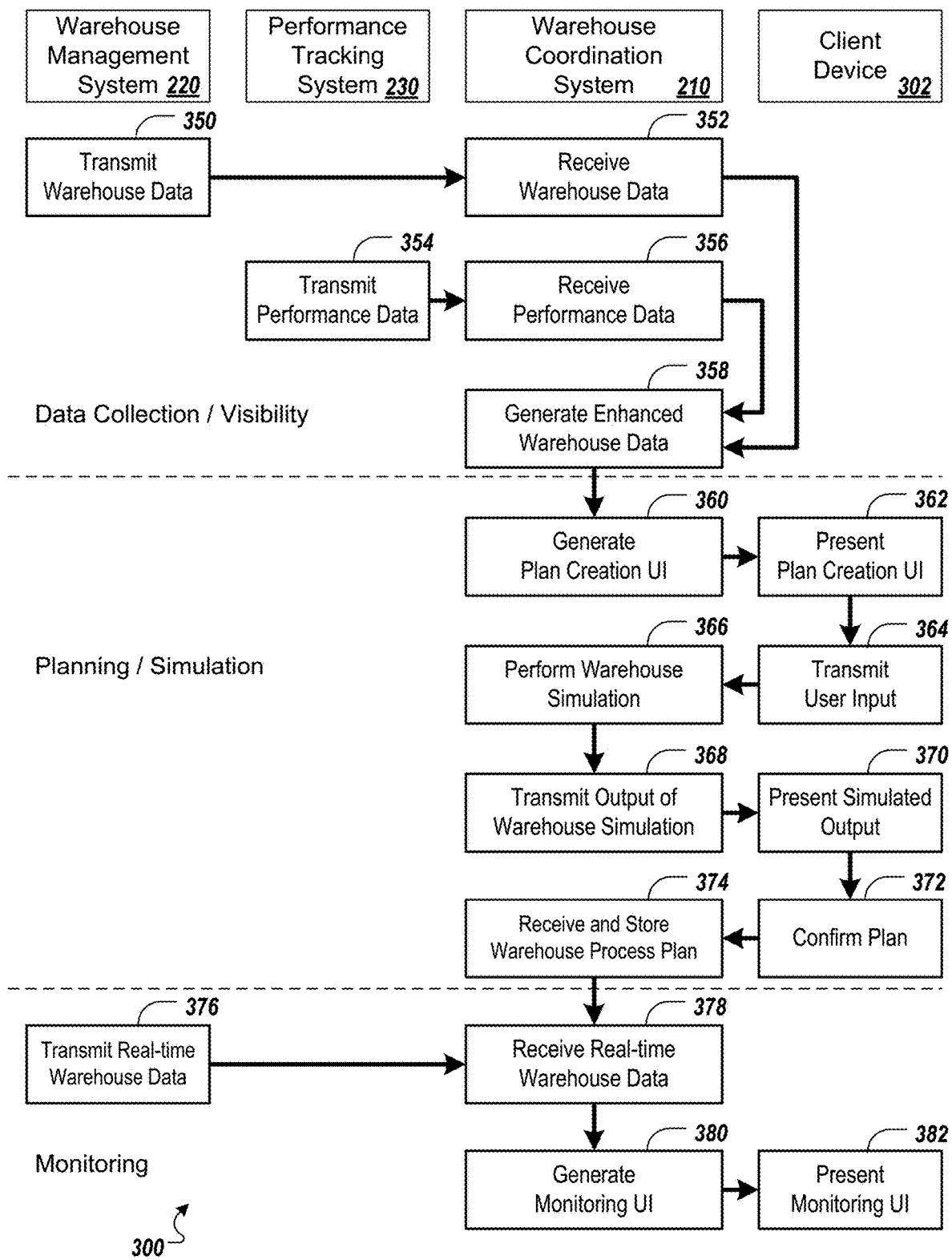
FIG. 3 is a flow diagram of an example technique for generating warehouse process plans and coordinating warehouse operations.

Referring now to FIG. 3, a flow diagram of an example technique 300 for generating warehouse process plans and coordinating warehouse operations is shown. In general, the example technique 300 includes data collection and visibility operations, planning and simulation operations, and monitoring operations that can be performed by various components of the system 200 (shown in FIG. 2) for generating warehouse process plans and coordinating warehouse operations. In the present example, the example technique 300 can be performed by the warehouse coordination system 210 (e.g., also shown in FIG. 2), the warehouse management system 220 (e.g., also shown in FIG. 2), the performance tracking system 230 (e.g., also shown in FIG. 2), the configuration system(s) 240 (e.g., also shown in FIG. 2) and a client device 302 (e.g., similar to any of the computing devices 122*a*-*d*, shown in FIG. 1A).

At 350, the warehouse management system 220 transmits warehouse data, and at 352, the warehouse coordination system 210 receives the warehouse data. Before, after, or concurrently, at 354, the performance tracking system 230 transmits performance data, and at 356, the warehouse coordination system 210 receives the performance data. Optionally, the configuration system(s) 240 (shown in FIG. 2) can transmit configuration data, and the warehouse coordination system 210 can receive such data. Referring to FIG. 1A, for example, during stage (A), the computing server(s) 160 (e.g., one or more computing servers for implementing components of the system 200) can receive warehouse, performance, and/or configuration data 170. The data 170, for example, can pertain to a current state of the warehouse environment 100, historical performance of various warehouse resources (e.g., equipment, workers, and/or teams), and/or a configuration of the warehouse environment and/or resources. Warehouse data received from the warehouse management system 220, for example, can include data related to current locations and contents of containers of goods in the warehouse environment 100, work that is to be performed in the warehouse environment 100 (e.g., goods to be received, moved, and/or sent), worker, teams, and equipment employed in the warehouse environment, and other relevant data for managing warehouse operations during a shift. Performance data received from the performance tracking system 230, for example, can include data related to historical performance (e.g., productivity statistics) of various equipment, workers, and/or teams in the warehouse environment 100. Configuration data received from the configuration system(s) 240, can pertain to a configuration of the warehouse environment 100.

At 358, the warehouse coordination system 210 generates enhanced warehouse data, based on the received warehouse data, performance data, and configuration data. Referring to FIG. 1A, for example, during stage (B), the computing server(s) 160 can generate enhanced data 172 based on the received warehouse/performance/configuration data 170, and can maintain the enhanced data 172 in data source(s) 162 (e.g., similar to the enhanced warehouse data source 250, shown in FIG. 2). For detailed and accurate planning, for example, neither warehouse data from the warehouse management system 220, nor performance data from the performance tracking system 230, nor configuration data from the configuration system(s) 240 may be entirely sufficient. For example, the warehouse data may include data related work tasks to be performed over a shift, but may lack data related to the performance capabilities of equipment, workers, and/or teams that perform the work tasks, and an environment in which the work tasks are performed. The performance data, for example, may include data related to performance capabilities, but may lack data related to work tasks to be performed. In general, generating the enhanced data 172 can include techniques for mapping performance capabilities of available equipment, workers, and/or teams to a backlog of work tasks to be performed, with respect to a particular environment. By generating and maintaining the enhanced data 172 in the data source(s) 162, and using the enhanced data for plan creation, work simulation, and progress monitoring applications, for example, load on the warehouse management system 220 and the performance tracking system 230 can be reduced. Further, by combining and cross-referencing data from the systems 220, 230, and 240, and preparing the data for use by the plan creation, work simulation, and progress monitoring applications, resources of the warehouse coordination system 210 can be conserved.

In some implementations, data related to performance capabilities may include productivity rates (e.g., a number of warehouse operations per time period) of various warehouse resources (e.g., equipment, workers, and/or teams or portions of teams). For example, performance data from the performance tracking system 230 can indicate that over a defined time range (e.g., the previous week, two weeks, four weeks, eight weeks, or another suitable time range), a team or a portion of a team (e.g., a specific picking team of the storage and retrieval team 120*b*, shown in FIG. 1A) has historically performed at a particular productivity rate (e.g., 250 cartons per hour) when picking a particular type of container (e.g., conveyable containers) from the storage area 110 (shown in FIG. 1A). When generating a production plan for the team, the performance data can be applied to work tasks to be performed to predict how many of the work tasks may be accomplished by the team during a shift. In some implementations, generating enhanced warehouse data may include attributing particular warehouse resources to warehouse tasks that have been and/or are being performed. For example, the warehouse management system 220 may store data that indicates that a warehouse task has been performed (e.g., a particular container of goods has been received at a particular time), but may lack data that indicates which warehouse resources performed the warehouse task. By attributing warehouse resources to warehouse tasks, for example, performance capabilities of various resources may be more readily determined.

In some implementations, generating enhanced warehouse data may include using configuration data that indicates how a warehouse is operationally and physically configured. For example, the data source(s) 162 (shown in FIG. 1A) can receive, maintain, and use data that maps areas of the warehouse environment 100 (shown in FIG. 1A) to various warehouse resources (e.g., equipment, workers, and/or teams or portions of teams) that are designated as being assigned to operate in the areas. As another example, the data source(s) 162 can use data that maps various warehouse resources and/or warehouse areas (e.g., one or more docks 102, shown in FIG. 1A) that are designated as being capable of handling containers 106 (shown in FIG. 1A) having particular properties (e.g., conveyable cartons, non-conveyable cartons, etc.). Based on the performance data and the configuration data, for example, a data linkage between work tasks to be performed during a shift, resources for performing the work tasks, and predicted productivities of the resources can be determined.

At 360, the warehouse coordination system 210 can use the plan creation interface generator 260 (shown in FIG. 2) to generate and provide data for a plan creation user interface. Referring to FIG. 1A, for example, during stage (C), the computing server(s) 160 can generate and provide data for plan creation user interface 180, for presentation and use by any of the computing devices 122a-d, shown in FIG. 1A). In general, the plan creation user interface 180 can be used by an operations manager of one of the teams 120a-d for creating a feasible work plan for their respective team, the work plan specifying work tasks to be accomplished by the team during a particular shift. In some implementations, a work plan may be optimized according to various optimization criteria (e.g., time, throughput, resources, etc.). For example, the plan creation user interface 180 can provide suggested sequencing and/or resource application values such that the work plan is optimized according to the criteria.

At 362, the plan creation user interface is presented by the client device 302 (e.g., similar to any of the computing devices 122a-d, shown in FIG. 1A). In general, plan creation interfaces may include multiple different screens which can be presented according to an application flow, in which an operations manager selects work tasks for their team to perform during a shift, the work tasks are sequenced, and resources (e.g., equipment, workers, and/or teams or portions of teams) are applied to the work. Once resources have been applied to the work tasks, for example, the work tasks can be simulated, and simulation results of performing the work tasks can be presented to the operations manager. If the simulation results are acceptable, for example, the operations manager may certify and submit a work plan that includes the selected, sequenced, and staffed work tasks. In some implementations, a different interface may be provided for creating work plans for each different team. For example, a receiving plan creation interface can be provided on computing device 122a for creating a work plan for the receiving team 120a, a storage and retrieval plan creation interface can be provided on computing device 122b for creating a work plan for the storage and retrieval team 120b, a sortation plan creation interface can be provided on computing device 122c for creating a work plan for the sortation team 120c, and a shipping plan creation interface can be provided on computing device 122d for creating a work plan for the shipping team 120d.

At 364, user input provided using the plan creation user interface is transmitted by the client device 302 for receipt by the warehouse coordination system 210. Referring to FIG. 1A, for example, the plan creation interface 180 can include a work task input interface 182 through which an operations manager (e.g., a manager of one of the teams 120a-d) can use various interface controls to select and sequence work tasks to be performed by their team during a shift, and to apply resources (e.g., equipment, workers, and/or teams or portions of teams) to the work tasks. In some implementations, at least a portion of the enhanced warehouse data can be presented on a plan creation user interface for a warehouse process. For example, the work task input interface 182 can present a list of work tasks that are available to be performed by a particular team during a particular shift (e.g., available work and/or work in progress, based on the enhanced data 172), and the operations manager can select from and sequence the available tasks. To assist the operations manager with applying resources to the work tasks, for example, the work task input interface 182 can present information related to resources that are available to the team during the shift (e.g., resource functions, productivity rates, and/or other relevant information, based on the enhanced data 172). Selection and sequencing of work tasks and application of the resources can be performed based on priority information presented along with the tasks, process guidelines of an organization, and/or expert knowledge of the operations manager, for example. In the present example, after the operations manager has selected and sequenced tasks (e.g., Task A, Task B, and Task C) to be performed by resources of their team (e.g., one of the teams 120a-d) during the shift, the operations manager can submit the selected, sequenced, and staffed work tasks for simulation by the computing server(s) 160, and can provide a command to run a simulation of performing the tasks by selecting the simulation control 184 of the work task input interface 182.

In response to receiving the user input and the simulation command, at 366, the warehouse coordination system 210 performs a simulation of the tasks to be performed over the shift for the warehouse process, according to the user inputs. For example, the warehouse coordination system 210 can receive from the client device 302 (e.g., similar to one of the computing devices 122a-d, shown in FIG. 1A) a data structure that includes data that indicates the selected, sequenced, and staffed work tasks input by the operations manager using the plan creation interface 180 (shown in FIG. 1), and can use the warehouse planning simulator 280 (shown in FIG. 2) to run a granular, discrete process simulation of the work tasks being performed in the warehouse environment 100 (shown in FIG. 1A). Running the process simulation, for example, can include modeling the selected work tasks according to the assigned sequence and the applied resources over time, using a collection of state variables that represent a current state of various warehouse entities (e.g., vehicles, equipment, workers, containers, products, etc.) within the warehouse environment 100. The state variables, for example, can be modified by the simulation to model an evolution of the state of the various warehouse entities over time.

At 368, the warehouse coordination system 210 transmits an output of the simulation of the tasks to be performed over the shift for the warehouse process, and at 370, the client device 302 presents the simulated output. Referring to FIG. 1A, for example, the plan creation interface 180 can include a simulation output interface 186 through which the operations manager can review the output of the simulation of the tasks (e.g., predicted throughput of a team over a shift when performing the warehouse process according to the specified plan). If the output is not acceptable, for example, the operations manager can again use the work task input interface 182 to adjust the work plan (e.g., by selecting different tasks, resequencing the tasks, and/or assigning different resources to the tasks), and can provide a command to run a simulation of the adjusted work plan. By experimenting with various different task, sequence, and resource scenarios, for example, operations managers can efficiently generate and refine feasible work plans for their respective teams. When the output is determined by the operations manager as being acceptable, for example, the operations manager can confirm and submit the work plan for his or her team for possible inclusion in an overall plan for a shift. In the present example, at 372 the work plan is confirmed and submitted by the operations manager at 372, who provides a command to confirm and submit the work plan by selecting the submission control 188 of the simulation output interface 186.

At 374, the warehouse coordination system 210 receives and stores the simulated warehouse process plan that specifies the tasks to be performed over the shift. Referring to FIG. 1A, for example, the computing server(s) 160 can store the plan in data source(s) 162, along with simulated output corresponding to the plan, and along with simulated plans/output for other warehouse teams 120a-d.

At 376, the warehouse management system 220 transmits real-time warehouse data, and at 378, the warehouse coordination system 210 receives the real-time warehouse data. Referring to FIG. 1A, for example, during stage (D), the computing server(s) 160 can receive real-time data 174 that pertains to work tasks being performed over the shift for the warehouse process in the warehouse environment 100. Real-time data provided by the warehouse management system 220, for example, can include data related to updated locations and/or contents of containers of goods in the warehouse environment 100, updated locations of equipment and/or workers in the warehouse environment 100, specific work tasks being performed by the equipment and/or workers, or other relevant real-time data. In some implementations, real-time data can be periodically or continually provided and received during a shift. For example, the warehouse management system 220 can periodically (e.g., once per minute, once every five minutes, once every fifteen minutes, or at another suitable time interval) provide updated batches of warehouse state data for receipt by the warehouse coordination system 210. As another example, the warehouse management system 220 can provide updated warehouse state data for receipt by the warehouse coordination system 210 as changes to the warehouse state occur.

At 380, the warehouse coordination system 210 can use the performance monitoring interface generator 270 (shown in FIG. 2) to generate and provide data for a performance monitoring user interface. Referring to FIG. 1A, for example, during stage (E), the computing server(s) 160 can generate and provide data for performance monitoring user interface 190. In general, the performance monitoring user interface 190 can be used by an operations manager of one of the teams 120a-d for comparing actual work progress during a shift according to real-time data, relative to predicted work progress during the shift according to the performed simulation of work tasks included in the warehouse process plan.

At 382, the performance monitoring user interface is presented by the client device 302 (e.g., similar to any of the computing devices 122a-d, shown in FIG. 1A). In general, performance monitoring user interfaces can include various numeric and/or graphical indications of actual work progress for a team during a shift, relative to predicted work progress for the team. In the present example, the performance monitoring user interface 190 includes a predicted work progress indicator 192 and an actual work progress indicator 194. The predicted work progress indicator 192, for example, represents work tasks that have been predicted to be performed by the team over the shift, according to the simulated warehouse process plan. The actual work progress indicator 194, for example, represents actual work tasks that have been performed by the team over the shift. As shown in the present example, the team overperformed during the first portion of the shift, then adjusted its performance (e.g., possibly as a result of a reallocation of resources prompted in one of the check & adjust periods 146a-b) such that its rate of performing work tasks was more closely aligned with its warehouse process plan. By aligning the actual production of teams to their respective production plans, for example, process bottlenecks and physical congestion can be reduced in the warehouse environment 100, improving overall efficiency across the various teams 120a-d. In some implementations, a different interface may be provided for presenting performance monitoring information for each different team. For example, a receiving performance monitoring interface can be provided on computing device 122a for monitoring performance of the receiving team 120a, a storage and retrieval performance monitoring interface can be provided on computing device 122b for monitoring performance of the storage and retrieval team 120b, a sortation performance monitoring interface can be provided on computing device 122c for monitoring performance of the sortation team 120c, and a shipping performance monitoring interface can be provided on computing device 122d for monitoring performance of the shipping team 120d.

Figure 4:
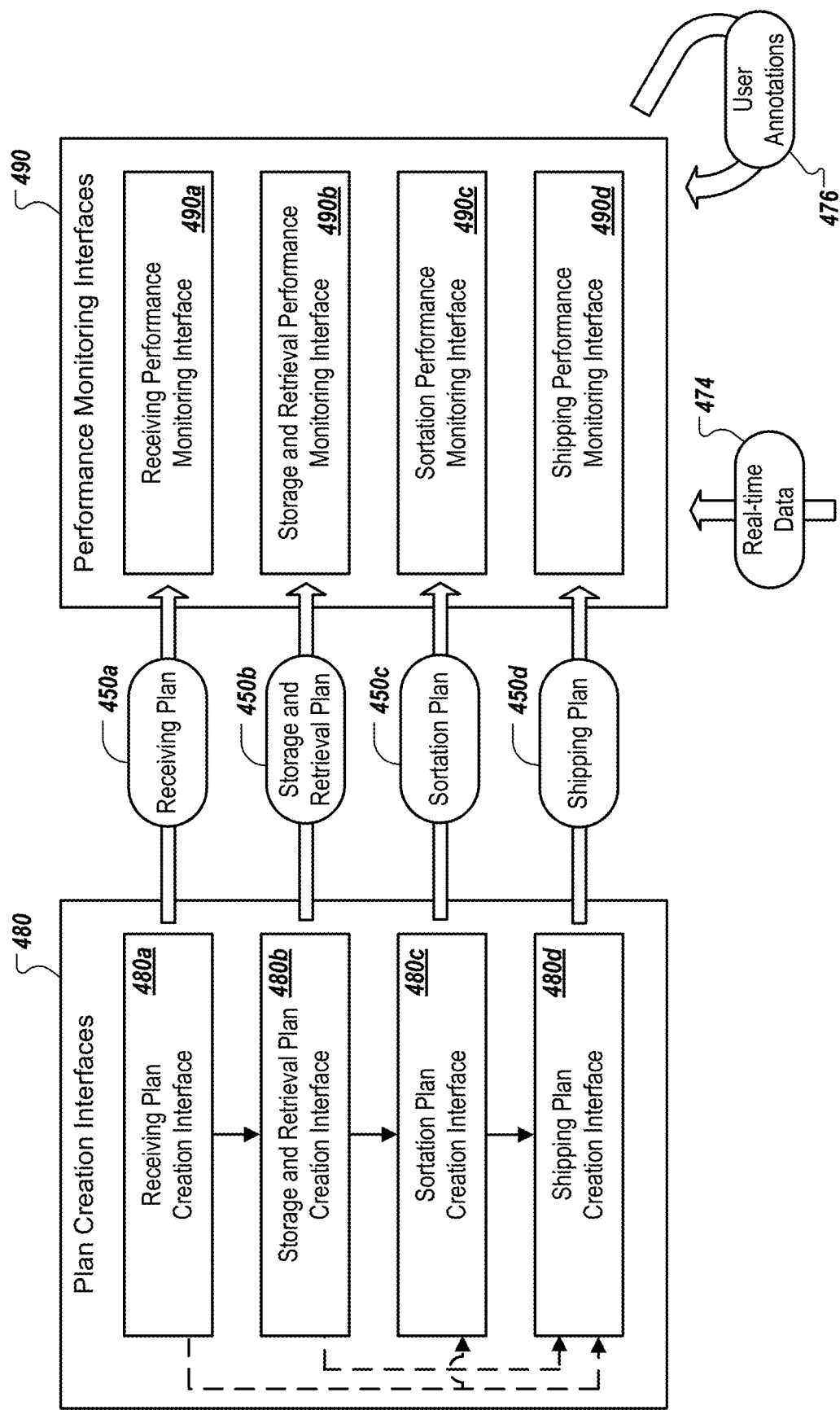
FIG. 4 shows example data interactions between warehouse process plan creation interfaces and warehouse performance monitoring interfaces.

Referring now to FIG. 4, example data interactions between warehouse process plan creation interfaces 480 and warehouse performance monitoring interfaces 490 are shown. Each of the plan creation interfaces 480 (e.g., similar to the plan creation interface 180, shown in FIG. 1A), for example, can be presented by a different computing device (e.g., one of the computing devices 122a-d, shown in FIG. 1A) used by an operation manager of a different team (e.g., one of the teams 120a-d, shown in FIG. 1A) to create a warehouse process plan for their respective team. In the present example, the plan creation interfaces 480 include a receiving plan creation interface 480a for creating a receiving plan 450a for the receiving team 120a, a storage and retrieval plan creation interface 480b for creating a storage and retrieval plan 450b for the storage and retrieval team 120b, a sortation plan creation interface 480c for creating a sortation plan 450c for the sortation team 120c, and a shipping plan creation interface 480d for creating a shipping plan 450d for the shipping team 120d.

In general, use of and interactions between the plan creation interfaces 480a-d can reflect operational workflow in a warehouse environment. For example, containers of goods in the warehouse environment 100 can generally be processed sequentially by the teams 120a-d, such that the containers are initially received by the receiving team 120a, are then handled by the storage and retrieval team 120b, are then optionally processed by the sortation team 120c, and are eventually shipped by the shipping team 120d. As shown in FIG. 4, and as shown in the shift timeline 130 of FIG. 1B, for example, the plan creation interfaces 480 can also be used sequentially to reflect the operational workflow, such that output resulting from simulation of planned work tasks of a first team is used as input for creating a work plan for a second team, after the work plan for the first team is confirmed and submitted by the first team's operations manager. In the present example, output resulting from simulation of planned work tasks for the receiving team 120a can be used as input for creating a work plan for the storage and retrieval team 120b, output resulting from simulation of planned work tasks for the storage and retrieval team 120b can be used as input for creating a work plan for the sortation team 120c, and output resulting from simulation of planned work tasks for the sortation team 120c can be used as input for creating a work plan for the shipping team 120d. In some implementations, output resulting from simulation of planned work tasks for an upstream team can be used as input for creating a work plan for any downstream team. For example, output resulting from simulation of planned work tasks for the receiving team 120a can be used as input for creating a work plan for the storage and retrieval team 120b, the sortation team 120c, and the shipping team 120d. Similarly, for example, output resulting from simulation of planned work tasks for the storage and retrieval team 120b can be used as input for creating a work plan for the sortation team 120c and the shipping team 120d. By cascading output generated using plan creation interfaces as input into other plan creation interfaces, for example, warehouse simulation processes can be simplified (e.g., by limiting the number of process variables), while promoting collaboration between the various teams.

In general, the performance monitoring interfaces 490 can be used to compare real-time work progress for various warehouse processes to simulated work plans. Real-time work progress, for example, can be determined based on real-time data 474 (e.g., similar to the real-time data 174, shown in FIG. 1A). Each of the performance monitoring interfaces 490 (e.g., similar to the performance monitoring interface 190, shown in FIG. 1A), for example, can be presented by a different computing device (e.g., one of the computing devices 122a-d, shown in FIG. 1A) used by an operation manager of a different team (e.g., one of the teams 120a-d, shown in FIG. 1A) to monitor performance of their respective team. In the present example, the performance monitoring interfaces 490 include a receiving performance monitoring interface 490a for monitoring performance of the receiving team 120a relative to the receiving plan 450a, a storage and retrieval performance monitoring interface 490b for monitoring performance of the storage and retrieval team 120b relative to the storage and retrieval plan 450b, a sortation performance monitoring interface 490c for monitoring performance of the sortation team 120c relative to the sortation plan 450c, and a shipping performance monitoring interface 490d for monitoring performance of the shipping team 120d relative to the shipping plan 450d.

In some implementations, performance monitoring interfaces may include mechanisms for receiving feedback based on observations related to real-time work progress for various warehouse processes relative to simulated work plans. For example, each of the performance monitoring interfaces 490a-d can include one or more controls for providing user annotations 476 (e.g., comments, markup, ratings, etc.) that are used to update the respective interface 490a-d (and, optionally, one or more other interfaces 490a-d). The user annotations 476, for example, can provide context for reported productivity metrics, and can be shared among various operations managers to help identify root causes of potential problems within the warehouse environment 100 and to help make collective decisions.

Figure 5:
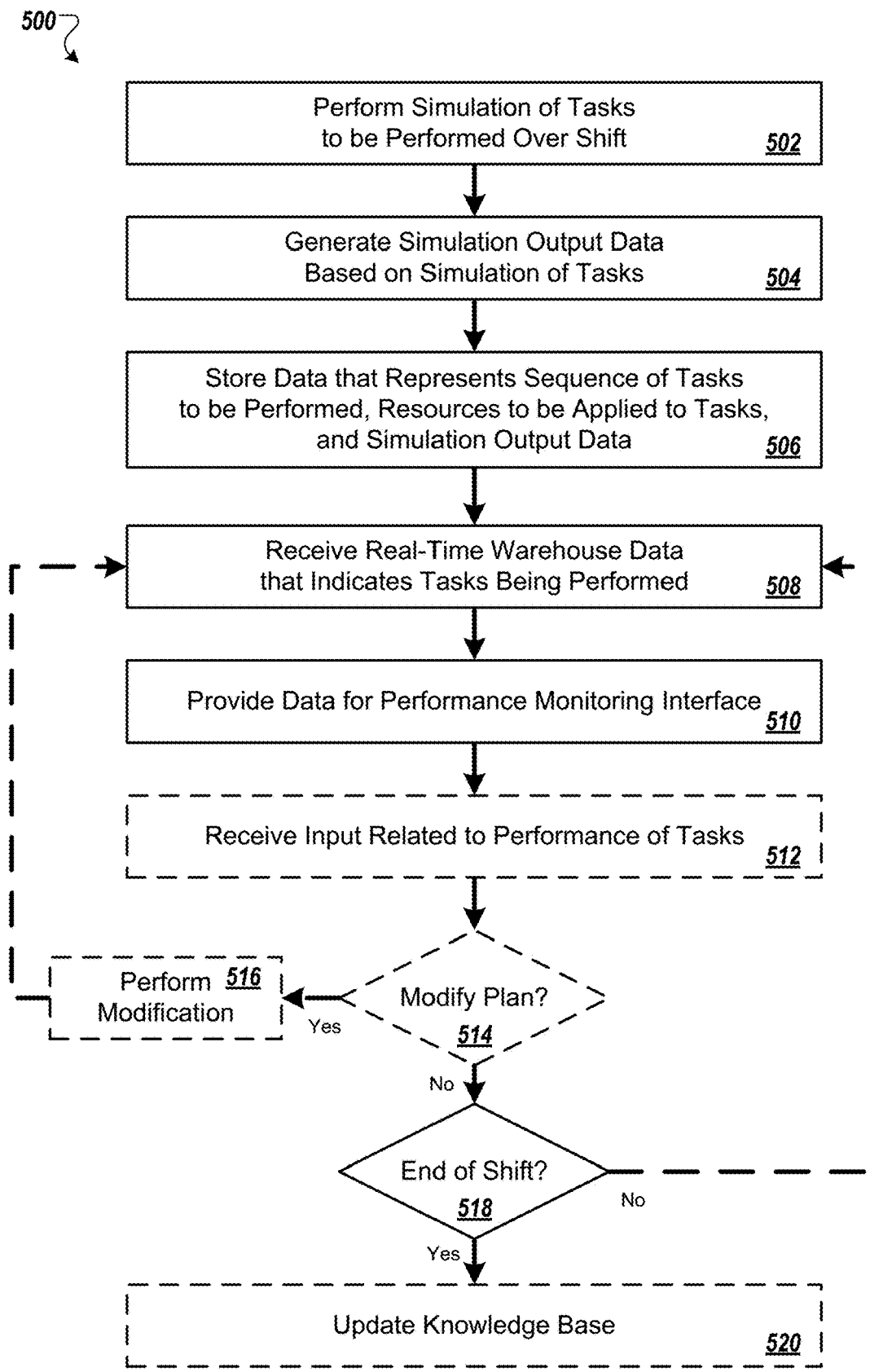
FIG. 5 is a flow diagram of an example technique for providing a warehouse performance monitoring interface.

Referring now to FIG. 5, a flow diagram of an example technique 500 for providing a performance monitoring interface for a warehouse process is shown. The warehouse process, for example, can be a receiving process (e.g., unloading containers from inbound trucks arriving at a warehouse), a storage and/or retrieval process (e.g., moving containers in and around the warehouse), a sortation process (e.g., unpacking goods from containers and repacking the goods in other containers), a shipping process (e.g., loading containers onto outbound vehicles for shipment), or another sort of process that occurs in a warehouse environment. In the present example, the example technique can be performed by the computing server(s) 160 (e.g., shown in FIG. 1A, implementing components of the system 200 (shown in FIG. 2)), and any of the computing devices 122a-d (shown in FIG. 1A).

Performance monitoring user interfaces can be used by various operations managers (e.g., respective managers of the receiving team 120a, the storage and retrieval team 120b, the sortation team 120c, and the shipping team 120d). Through use of the performance monitoring user interfaces, for example, collaboration among different teams within a warehouse can be facilitated in order to provide balance and harmony between the teams and to improve overall efficiency under a production plan. The user interface features can include pacing production metrics that team leaders are instructed to follow, along with variances indicating acceptable ranges of those metrics. The interface can also provide alerts prompting team leaders for feedback on deviations of actual production metrics from the pacing production metrics. Additionally, the interface can prompt collaborative check-ins among team leaders throughout a work shift, which can facilitate adjustments and modifications to each team's performance in order to meet performance goals. By providing operations managers with a performance monitoring interface that aggregates and simplifies complex data, for example, the operations managers can more effectively focus on their respective objectives, which may be to produce according to the performance goals (instead of always a maximum amount), in order to improve efficiency for the warehouse as a whole.

In general, different performance monitoring interfaces may be provided for monitoring the performance of different warehouse teams that each perform different types of warehouse operations. As described with respect to FIG. 4, for example, different performance monitoring interfaces can be provided for monitoring the performance of the receiving team 120a, the storage and retrieval team 120b, the sortation team 120c, and the shipping team 120d. A general application flow of each of the different performance monitoring interfaces is described with respect to FIG. 5, for example, however each different performance monitoring interface can be customized to possibly have a different application flow, and/or to monitor the performance of a different warehouse process. In further detail, example performance monitoring interfaces for receiving operations are described below with respect to FIGS. 6A-C, an example performance monitoring interface for storage and retrieval operations is described below with respect to FIG. 7, an example performance monitoring interface for sortation operations is described below with respect to FIG. 8, an example performance monitoring interface for shipping operations is described below with respect to FIG. 9, and an example performance monitoring interface for a check and adjust session is described below with respect to FIG. 10.

At 502, a simulation of tasks to be performed over a shift can be performed. For example, a warehouse coordination system implemented by the computing server(s) 160 can perform a simulation of tasks to be performed over a shift for a warehouse process (e.g., a receiving process, a storage and/or retrieval process, a sortation process, an shipping process, etc.), according to a defined sequence of the tasks to be performed and defined resources (e.g., equipment, workers, and/or teams or portions of teams) to be applied to the tasks. In some implementations, a defined sequence of tasks to be performed and/or defined resources to be applied to the tasks may be provided through one or more user interfaces. For example, the warehouse coordination system implemented by the computing server(s) 160 can receive, through the plan creation interface 180, a simulation command to execute a simulation of tasks to be performed over the shift for the warehouse process (e.g., as a result of the user selecting the simulation control 182). In response to receiving the simulation command, for example, the warehouse coordination system can execute the simulation of the tasks. The simulation, for example, can be executed according to user input that indicates the sequence of the tasks to be performed, and according to user input that indicates the resources to be applied to the tasks. Optionally, the simulation of the tasks to be performed over the shift for the warehouse process can also be performed according a defined configuration of a warehouse environment. For example, the warehouse coordination system implemented by the computing server(s) 160 can receive user input through a warehouse configuration portion of the plan creation interface 180 that indicates a configuration of the warehouse environment 100 in which a warehouse process is to be performed. Configuration information provided through the configuration portion of the plan creation interface 180, for example, can include information that may not be available from the warehouse management system(s) 220 (shown in FIG. 2) or performance tracking system(s) 230 (shown in FIG. 2), such as information related to docks 102, storage racks 112, and/or equipment 116 that are available (or unavailable) for performing tasks during a shift, and other relevant warehouse configuration information.

At 504, simulation output data can be generated, based on the simulation of tasks to be performed. For example, the warehouse coordination system implemented by the computing server(s) 160 can generate simulation output data resulting from the simulation of the tasks to be performed. As shown in FIG. 2, for example, the warehouse coordination system 210 can use the warehouse planning simulator 270 to run granular, discrete process simulations for operations to be performed by any of the teams 120a-d during a shift. When running the process simulations, for example, the tasks to be performed over the shift by one of the teams 120a-d can be modeled according to the defined task sequence, and according to the defined resources to be applied to the tasks (and optionally, according to the defined configuration of the warehouse environment). In some implementations, the simulation may be performed at a unit level (e.g., pallet, carton, package, or another transportable container of goods). Transportable containers of goods can be of different types, such as conveyable freight units that are capable of being processed by automated equipment, for example, and non-conveyable freight units that are to be processed mainly through manual interaction. The simulation output data can indicate that a particular transportable container, a particular type of transportable container, and/or a transportable container from a particular vehicle or area of the warehouse environment 100 is estimated to be processed at a particular time (or during a particular time range), according to a warehouse plan represented by the output data. By performing a discrete process simulation at the unit level, for example, warehouse plans can be feasible, accurate, and readily comparable with real-time warehouse data.

At 506, data that represents the defined sequence of the tasks to be performed, data that represents the defined resources to be applied to the tasks, and the simulation output data can be stored. For example, the warehouse coordination system implemented by the computing server(s) 160 can store (e.g., in data source(s) 162) the user input that indicates the sequence of tasks to be performed, the user input that indicates the resources to be applied to the tasks, and the simulation output data based on the simulation of the tasks to be performed.

At 508, real-time warehouse data that indicates tasks being performed over the shift for the warehouse process can be received. For example, the computing server(s) 160 can receive real-time data 174 that pertains to work tasks being performed in the warehouse environment 100 by any of the teams 120a-d for a respective warehouse process (e.g., receiving, storage and/or retrieval, sortation, shipping). In general, team leaders may direct their teams to perform work tasks according to a work plan represented by the simulation output data, however some tasks may be performed more quickly than estimated, more slowly than estimated, or out of sequence according to the work plan. The real-time data 174, for example, can indicate a current status of containers, equipment, and/or workers in the warehouse environment 100, such as actual locations and/or contents of containers of goods, locations of equipment and/or workers, specific work tasks being performed by the equipment and/or workers, and other real-time data. For example, the warehouse management system(s) 220 (shown in FIG. 2) can communicate with data collection devices (e.g., manual input devices, scanners, cameras, or other suitable devices) in the warehouse environment 100, and can receive real-time operation data when containers are processed by workers and/or equipment for various work tasks (e.g., unloading a container from an inbound vehicle, transporting the container from a location to another location, storing the container in a storage location, retrieving the container from the storage location, unpacking the container, repacking the container, loading the container onto an outbound vehicle, or another work task). The real-time operations data, for example, can include an operation timestamp, and various identifiers related to the operation, such as location, worker, team, container, container type, and/or goods identifiers, and can be received periodically or continually during a shift.

At 510, data can be provided for a performance monitoring interface for a warehouse process. For example, the computing server(s) 160 can provide real-time data and simulation output data for performance monitoring interface 190. A leader (e.g., an operations manager) of any of the teams 120a-d can use the performance monitoring interface 190, for example, to compare actual work progress of their respective team during a shift according to the real-time data for the team, relative to predicted work progress of the team according to the simulation output data for the team. By providing a customized interface for each different team, for example, a team leader can have access to data that is useful for making decisions for their particular team, without having to review data that mainly pertains to other teams. The performance monitoring interface 190, for example, can present, for each time period of a plurality of time periods (and/or for a given point in time), an amount of tasks that have been predicted to be performed by the team according to the simulation of the tasks, in comparison to an amount of tasks that have been performed according to the real-time warehouse data. An amount of tasks can be represented by a number of containers (e.g., broken down by container types, and/or containers from particular vehicles or areas) that are predicted to be or actually have been processed according to a work task (e.g., unloading, transporting, storing, retrieving, unpacking, repacking, loading, or another sort of task), for example. A different performance monitoring interface 190 can be provided for various different warehouse operations (e.g., receiving, storage and/or retrieval, sortation, and shipping), as described in further detail in the examples below.

Figure 6A:
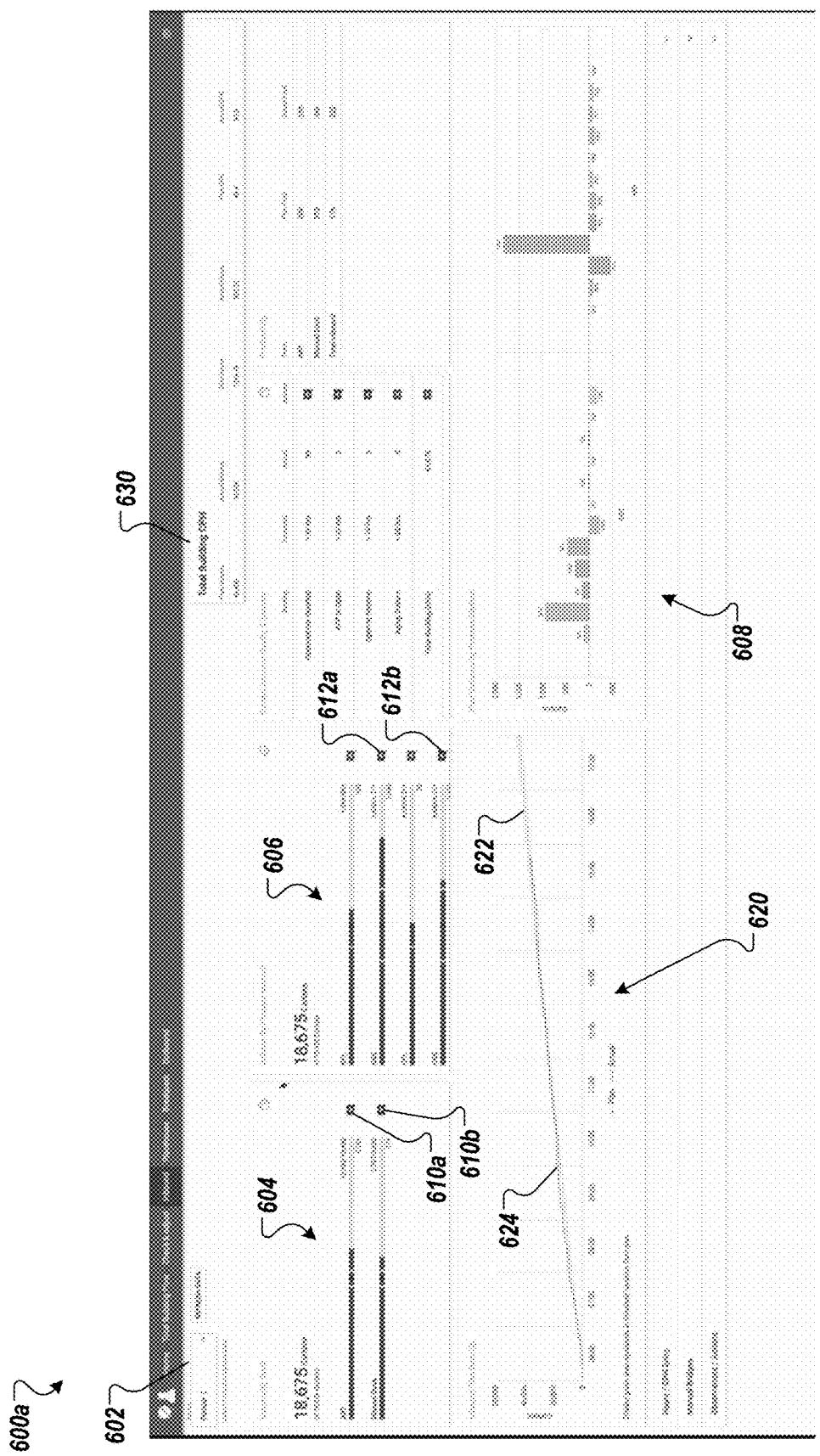
Figure 6B:
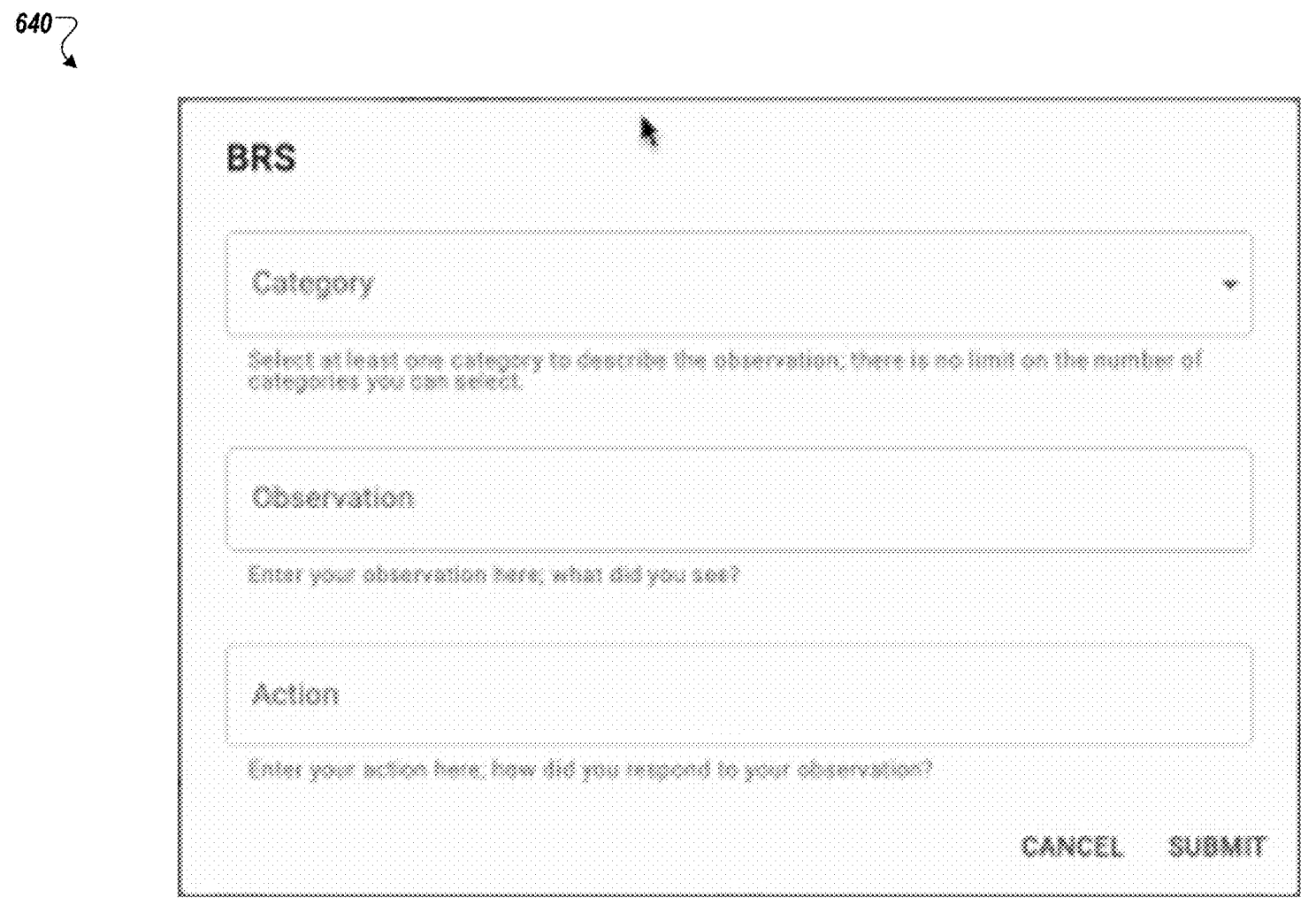
Figure 6C:
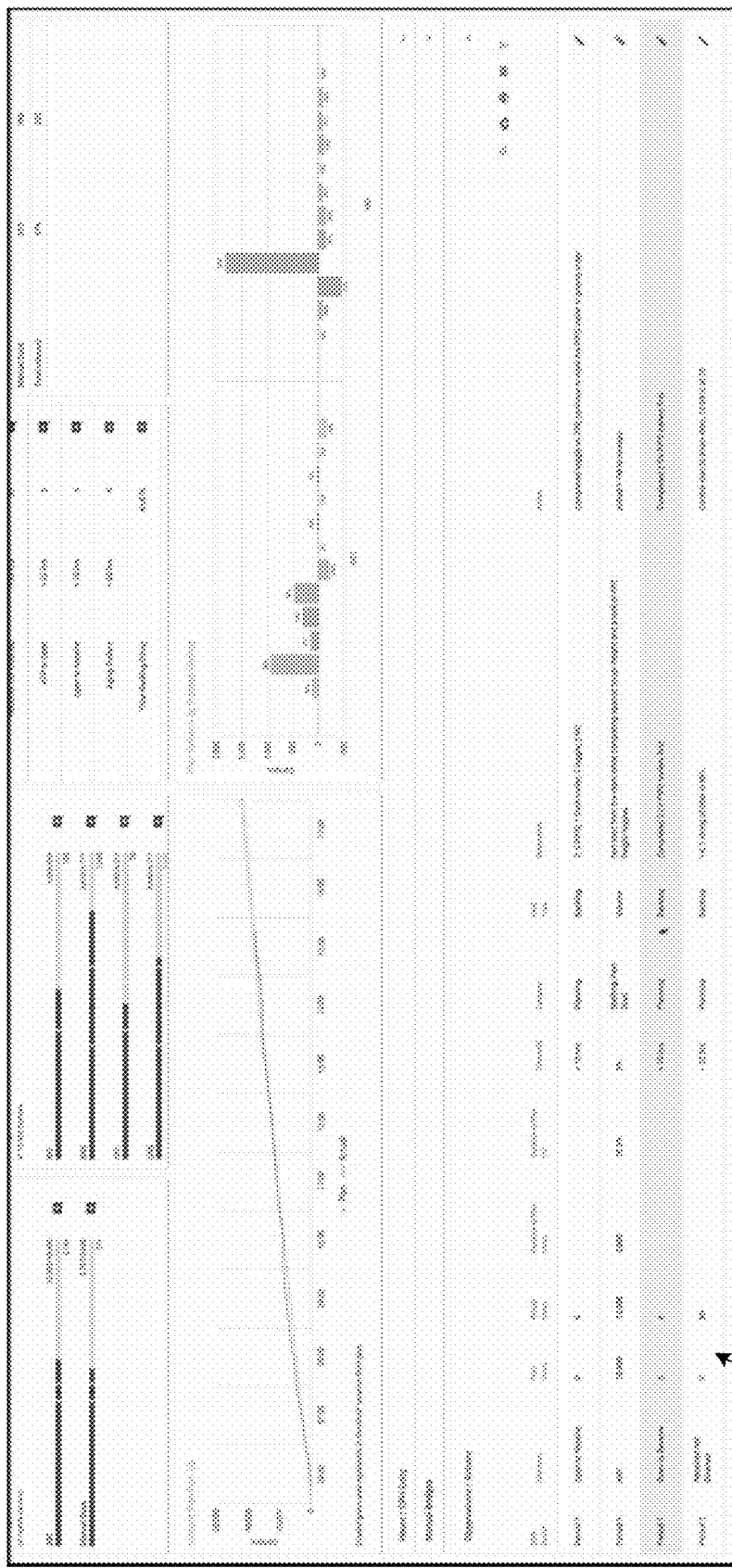

Referring now to FIGS. 6A-C, example performance monitoring interfaces for receiving operations are shown. Performance monitoring interface 600a (shown in FIG. 6A) for receiving operations, for example, can be used to compare actual work progress of the receiving team 120a during a shift according to real-time data for the receiving team, relative to predicted work progress for the receiving team according to the simulation output data for the receiving team. Actual work progress relative to predicted work progress can be determined for each time period of a plurality of time periods that occur during a shift, for example. In the present example, the shift includes three four-hour time periods—a first time period that occurs from 06:00-10:00, a second time period that occurs from 10:00-14:00, and a third time period that occurs from 14:00-18:00. However, in other examples, a different number of time periods may be specified, and/or the time periods may be of different lengths and/or may occur over different time intervals.

The performance monitoring interface 600a, for example, includes a time period selection control 602 that can be used to select a previous, current, or future time period of a shift. In response to receiving user input from the time period selection control 602, for example, the performance monitoring interface 600a can be updated to present work progress information related to a selected time period (e.g., actual work progress compared to predicted work progress for the selected time period, and/or cumulative actual work progress compared to cumulative predicted work progress for the entire shift up to the selected time period). In the present example, a current time is 15:45, and the user has selected the first time period (e.g., to review what had occurred earlier in the shift).

The performance monitoring interface 600a, for example, can also include presentation controls that present views of actual work progress compared to predicted work progress of the receiving team 120a during a shift. For example, the performance monitoring interface 600a includes a volume by dock presentation control 604 that presents, for each different area in which the receiving team 120a performs tasks in the warehouse environment 100 (e.g., an ART (Automated Receiving) dock, and a Manual dock), a view of actual work progress of the receiving team relative to predicted work progress. In the present example, at the end of the first period, the receiving team 120a had been predicted to process 15,420 cartons, with 10,400 of those cartons being processed at the ART dock, and 5,020 of those cartons being processed at the Manual dock. However, based on the real-time data, for example, the receiving team 120a had actually processed 18,675 cartons, with 12,593 of those cartons being processed at the ART dock, and 5,797 of those cartons being processed at the Manual dock.

In some implementations, a performance monitoring interface may present an alert when an amount of tasks that have been performed according to the real-time warehouse data is outside of a predetermined variance for an amount of tasks that had been predicted to be performed according to the simulation of tasks. For example, during and/or at the end of the first time period (e.g., during check & adjust period 146a at the end of the first shift period 134a, shown in FIG. 1B) an operations manager of the receiving team 120a can review the volume by dock presentation control 604 for possible alerts that indicate that an amount of tasks (e.g., a number of cartons processed) that have been performed according to the real-time warehouse data is outside of a predetermined variance for an amount of tasks that had been predicted to be performed. The predetermined variance, for example, can be a percentage value (e.g., 5%, 10%, 20%, or another suitable percentage value) that is used for a variance around a target value (e.g., a predicted value according to the simulation of tasks). As another example, a first percentage value can be used for a variance that is higher than the target value, and a second, different percentage value can be used for a variance that is lower than the target value. In the present example, at the end of the first time period, the receiving team 120a had processed 21% more cartons than predicted at the ART dock, and 15% more cartons than predicted at the Manual dock, as determined by comparing the real-time data to the simulated work plan for the receiving team. Thus, in the present example, an alert 610a (e.g., a graphical icon and/or a selectable control) can be provided by the performance monitoring interface 600a that indicates that the performance of work tasks by the receiving team 120a at the ART dock is outside of the predetermined variance, and another alert 610b can be provided by the performance monitoring interface 600a that indicates that the performance of work tasks by the receiving team at the Manual dock is also outside of the predetermined variance.

Through such alerts, for example, operations managers can be notified of specific areas of underproduction and/or overproduction by their respective teams. The operations managers can then quickly identify sources of potential problems, and can adjust resources from one team to another (or a portion of a team to another portion), such that operations in the warehouse environment 100 proceed according to an overall plan. For example, if the receiving team 120a underproduces, a downstream operation (e.g., operations performed by the storage and retrieval team 120b) may not have access to enough cartons to proceed according to their own plan (e.g., a storage and retrieval plan), causing wasted downstream productivity. On the other hand, if the receiving team 120a overproduces, for example, backlogs of cartons may be built up in the warehouse environment 100, leading to congested areas, and reduced efficiency of the storage and retrieval team 120b. Use of the various performance monitoring interfaces, for example, can help the operations managers to follow their respective work plans and to collaborate with each other, such that overall efficiency across an organization is maximized.

In some implementations, a performance monitoring interface may present multiple different presentation controls, each presentation control presenting a different view (e.g., broken down by a different type of data) of an actual performance of work tasks compared to a predicted performance of the work tasks. For example, the volume by dock presentation control 604 breaks down actual and predicted performance of work tasks (e.g., processed cartons) by warehouse area, whereas a volume by process presentation control 606 breaks down actual and predicted performance of work tasks by container type. The volume by process presentation control 606, for example, presents, for each different type of carton processed by the receiving team 120*a* (e.g., BFL, BRS, CFL, CRS, NFL, NRS, PFL, PRS, TFL, TRS, and Unknown), a view of actual work progress of the receiving team relative to predicted work progress. In the present example, at the end of the first period, the receiving team 120*a* had been predicted to process 15,420 cartons, with 990 of those being BFL cartons, 1,771 of those being BRS cartons, 4,212 of those being CFL cartons, and 5,727 of those being CRS cartons. However, based on the real-time data, for example, the receiving team 120*a* has actually processed 18,672 cartons, with 1,098 of those being BFL cartons, 2,870 of those being BRS cartons, 4,282 of those being CFL cartons, and 5,880 of those being CRS cartons. Similar to the alerts 610*a-b* provided for data presented by the volume by dock presentation control 604, alerts 612*a-b* can be provided with respect to the BRS cartons and the CRS cartons in the present example, as for each of these types of cartons, a number of cartons that has been processed by the receiving team 120*a* during the first period is outside of a predetermined variance for a number of cartons that had been predicted to be processed by the receiving team. In the present example, the performance monitoring interface 600*a* also includes a plan variance by process method control 608 that breaks down actual and predicted performance of work tasks (e.g., processed cartons) by warehouse area and by container type. The plan variance by process method control 608 in the present example is a bar graph that shows a number of cartons that have been processed in each warehouse area (e.g., ART dock and Manual dock) and by carton type, according to the real-time data and relative to the predicted number of processed cartons. By referring to the plan variance by process method control 608 in the present example, an operations manager can quickly determine that overproduction by the receiving team 120*a* during the first period is largely due to over processing CRS containers in the Manual dock area. This sort of granular information, for example, can help the operations manager quickly identify the source of the problem, and make adjustments to correct the problem.

In some implementations, a performance monitoring interface may include a first graphical indicator that plots, along a time axis, a cumulative amount of work tasks that had been predicted to be performed according to the simulation of tasks, and a second graphical indicator that plots, along the time axis, a cumulative amount of work tasks that have been performed according to the real-time warehouse data. For example, the performance monitoring interface 600*a* can include a receiving plan control 620 that plots, along a time axis for the shift (e.g., from 6:00 to 18:00), a graphical indicator 622 (e.g., a "plan" indicator) that represents a cumulative number of cartons that had been planned to be processed by the receiving team 120*a*, and a graphical indicator 624 (e.g., an "actual" indicator) that represents a cumulative number of cartons that have actually been processed, at each point in time along the time axis. In some implementations, the first graphical indicator represents a predetermined variance for the cumulative amount of tasks that had been predicted to be performed according to the simulation of tasks. For example, the graphical indicator 622 (e.g., the "plan" indicator) can be a line having an expanding thickness plotted over time, the line thickness representing a range of an amount of work tasks that can be performed by the receiving team 120*a* at a given time, while falling within the predetermined variance. In the present example, the receiving plan control 620 shows that at the end of the first period (e.g., 10:00), the receiving team 120*a* had been overproducing relative to its plan, and that the team had then adjusted its rate of production (e.g., as a result of a check & adjust session and a reallocation of resources). Over the course of the remainder of the shift, for example, the receiving team 120*a* had mainly produced within the predetermined variance represented by the graphical indicator 622. Through the receiving plan control 620, for example, an operations manager of the receiving team 120*a* can quickly determine whether the team is performing according to its simulated plan, and can track the overall progress of the team over time.

Referring again to FIG. 5, at 512, input that relates to the performance of tasks over a shift can optionally be received. For example, input mechanisms (e.g., selectable user interface controls, data entry controls, voice input, data from data collection devices, etc.) can be provided (e.g., through the performance monitoring interface 190 shown in FIG. 1A, through another sort of user interface, and/or through an automated data collection interface) to provide information related to performance of tasks during the shift, such as observations made by the operations managers during the shift, actions taken during the shift, staffing change events (e.g., team members joining or leaving the team during the shift, an occurrence of an injury to a team member, etc.), equipment change events (e.g., equipment coming online/offline, equipment malfunctioning, etc.), and/or information related to other events that may occur during the shift that may impact the performance of tasks according to a production plan (e.g., weather events, power outages, early or late arrivals of vehicles to a warehouse, etc.). In general, the information related to the performance of tasks can be maintained by the computing server(s) 160 of the warehouse management system, can be shared among multiple operations managers through their respective performance monitoring interfaces 190 (e.g., a performance monitoring interface for use during a check and adjust session), and/or can be used to update a knowledge base that aggregates information related to task performance and correlates the information with possible deviations of actual productivity of a team from predicted productivity of the team. In some implementations, performance monitoring interfaces can provide one or more input mechanisms for providing operator information when the amount of tasks that have been performed according to the real-time warehouse data is outside of a predetermined variance for the amount of tasks that had been predicted to be performed according to the simulation of tasks. For example, operations managers can interact with the performance monitoring interface 190 to provide information related to underperformance or overperformance of their respective teams during the shift.

Referring now to FIG. 6B, for example, a user input control 640 of the performance monitoring interface 600*a* is shown. In the present example, the user input control 640 can be presented by the performance monitoring interface 600*a* in response to a user interacting with alert 612*a* (shown in FIG. 6A). The alert 612a (e.g., a selection control as indicated by a particular icon, color, text, etc.), for example, can be presented by the performance monitoring interface 600a when the actual performance of the receiving team 120a is outside of the predetermined variance (e.g., due to overproduction or underproduction) for the amount of tasks that had been predicted to be performed according to the simulated work plan for the team. In the present example, the operations manager of the receiving team 120a can select the alert 612a to provide information related to a production discrepancy of the receiving team 120a during the first shift with respect to BRS cartons. Using the user input control 640, for example, the operations manager can select one or more categories that describe an observation/event related to the production discrepancy, can provide text describing the observation/event, and can provide text describing an action that the manager performed to respond to the observation/event. For example, the selectable categories can include general observations and/or various event categories, such as staffing change events, equipment change events, or other events that may impact the performance of tasks according to a production plan (e.g., weather events, power outages, early or late arrivals of vehicles to a warehouse, etc.). Information provided through the user input control 640, for example, can be stored by the warehouse coordination system implemented by the computing server(s) 160. The information, for example, can be shared among operations managers across different teams, shifts, and/or warehouse environments, and can be added to a knowledge base (e.g., implemented by one or more of the data sources 162) for identifying performance trends and/or recurring problems, and for facilitating performance and planning improvements.

Referring now to FIG. 6C, for example, a performance monitoring interface 600c (e.g., similar to the performance monitoring interface 600a, shown in FIG. 6A) is shown. The performance monitoring interface 600c, for example, presents observations/events and actions 670 that have been provided by an operations manager using the user input control 640. The observations/events and actions 670, for example, can be collected over time during the shift, and can serve as working notes to be shared with operations managers of other teams during one or more of the check and adjust periods 146a-b and/or the end of shift recap period 146c, to facilitate cooperation between the operations managers and overall process improvements.

Referring again to FIG. 5, at 514, a determination of whether a work plan is to be modified is performed, based on received input related to a performance of tasks during a shift. In the present example, user input received through a performance monitoring interface (e.g., input received through the user input control 640 of the performance monitoring interface 600a, shown in FIG. 6B) can be analyzed by the computing server(s) 160 to determine whether the received input indicates that a work plan is to be modified. In some implementations, determining whether the work plan is to be modified may include determining whether the received input indicates a change to any of the defined resources that have been applied to the work tasks for which a simulation of tasks has been performed. For example, the received input can indicate that a staffing event change has occurred (e.g., a worker was added to or removed from a team during the shift), an equipment change has occurred (e.g., additional equipment was used by the team, a piece of equipment malfunctioned, etc.), or another change has occurred to a resource represented by simulation input. In some implementations, determining whether the work plan is to be modified may include determining whether the received input is associated with an event and/or observation that is represented in a knowledge base that correlates aggregated observations/events with deviations of predicted productivity from actual productivity. For example, the received input can indicate that a particular event (e.g., a weather event such as a snowstorm, a power loss event, an early/late vehicle arrival event, or another sort of event) is correlated with a deviation (e.g., a percentage increase or decrease) in team productivity over a shift, according to aggregated observation/event data maintained by the knowledge base.

At 516, in response to determining that a work plan is to be modified, the work plan can be modified. For example, the warehouse coordination system implemented by the computing server(s) 160 can modify a work plan (e.g., including tasks that are predicted to be performed) for a team for a remainder of a shift, based on the received input related to the performance of tasks. In some implementations, modifying a work plan for a team may include performing an updated simulation of tasks for the team. For example, the warehouse coordination system can perform a simulation of tasks to be performed over a remaining portion of a shift for a warehouse process (e.g., a receiving process, a storage and/or retrieval process, a sortation process, a shipping process, etc.), according to a sequence of tasks to be performed over the remaining portion of the shift, and according to the defined resources to be applied to the work tasks, as modified by the received input related to the performance of tasks (e.g., input indicating an increase or decrease in workers and/or equipment to be applied over the remaining portion of the shift). Performing the updated simulation, for example, can include performing a task simulation (502), generating simulation output data (504), and storing the data (506), as described above. In some implementations, modifying a work plan for a team may include adjusting a predicted productivity for the team according to an adjustment factor that is correlated with aggregated observations/events that match the received input related to the performance of tasks. For example, in response to receiving input that indicates that a particular event (e.g., a weather event such as a snowstorm, a power loss event, an early/late vehicle arrival event, or another sort of event) has occurred, the knowledge base can be accessed, an adjustment factor for the particular event can be identified, and the adjustment factor can be applied to a predicted productivity for the team for the remaining portion of the shift. By modifying a work plan for a team (including updating a task simulation and/or adjusting a predicted productivity of the team), for example, expectations of an operations manager of the team (and other operations managers of other teams) can be aligned with current warehouse capabilities.

During a shift, for example, real-time warehouse data that indicates tasks being performed can continue to be received (508), and data can continue to be provided for performance monitoring interfaces (510). At the end of the shift (518), for example, a knowledge base can optionally be updated (520). For example, the computing server(s) 160 can update the knowledge base (e.g., implemented by one or more of the data sources 162) with input data related to a performance of tasks during the shift (e.g., observations/events/actions), and data that represents actual productivity of the team relative to predicted productivity of the team over the shift. Data provided to the knowledge base can be aggregated over time (e.g., over multiple different shifts), and correlated productivity deviations can be identified for particular observations/events/actions for particular teams (e.g., using various machine learning techniques). The knowledge base of observations/events/actions and correlated productivity deviations can be used, for example, to accurately adjust predicted productivities for teams in response to a reoccurrence of an observation/event/action, and/or for future planning/simulation cycles.

Figure 7:
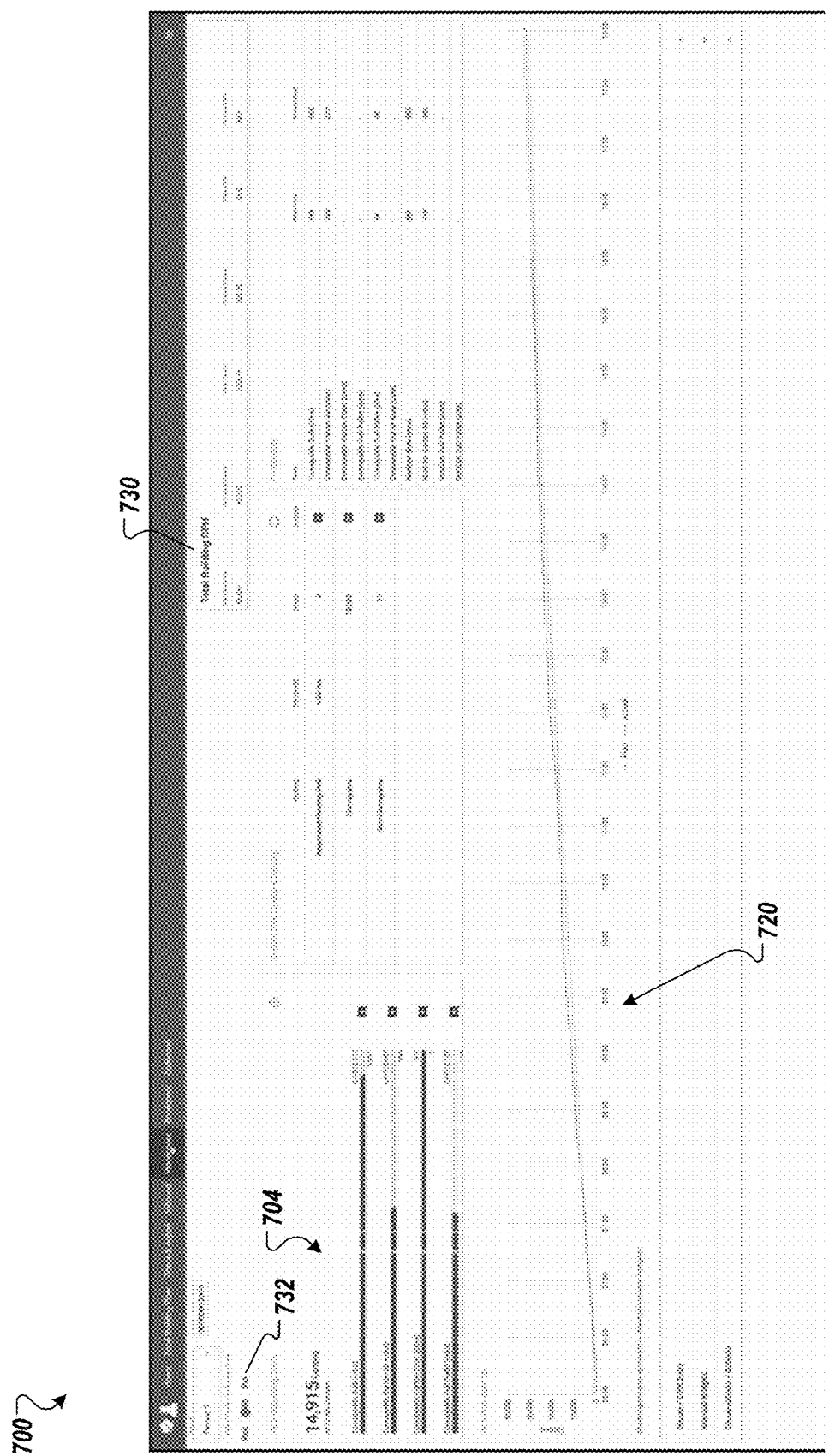
FIG. 7 depicts an example performance monitoring interface for storage and retrieval operations.

Referring now to FIG. 7, an example performance monitoring interface 700 for storage and retrieval operations is shown. The performance monitoring interface 700 for storage and retrieval operations, for example, can be used to compare actual work progress of the storage and retrieval team 120b during a shift according to real-time data, relative to predicted work progress for the storage and retrieval team according to simulation output data. Similar to performance monitoring interface 600a (shown in FIG. 6A), for example, the performance monitoring interface 700 can include a time period selection control for selecting a time period of a shift, one or more presentation controls that present views of actual work progress compared to predicted work progress for the shift (e.g., for the storage and retrieval team 120b), and graphical indicators that plot, along a time axis, a cumulative amount of work tasks that had been predicted to performed according a task simulation, relative to a cumulative amount of work tasks that have actually been performed (e.g., by the storage and retrieval team 120b). Also similar to performance monitoring interface 600a, for example, the performance monitoring interface 700 can provide alerts when an amount of tasks that have been performed according to the real-time warehouse data is outside of a predetermined variance for an amount of tasks that had been predicted to be performed according to the task simulation (e.g., for the storage and retrieval team 120b), can provide one or more information controls for receiving operator information with respect to the alerts, and can collect provided information over the shift.

In some implementations, performance monitoring interfaces may include one or more controls for selecting one or more types of tasks that may be performed in a warehouse environment. For example, the performance monitoring interface 700 can include a task type selection control 732 through which an operations manager can select a type of task that can be performed by the storage and retrieval team 120b. The storage and retrieval team 120b, for example, can perform pick tasks (e.g., retrieving containers from storage locations) and put tasks (e.g., placing containers into storage locations). In response to receiving a task type selection through the task type selection control 732, for example, the performance monitoring interface 700 can be updated to present information (e.g., based on data that compares actual work task progress relative to predicted work task progress) relevant to the selected task type. In the present example, a task type selection of "pick" has been made, and information related to simulated and actual pick tasks performed by storage and retrieval team 120b is presented by the performance monitoring interface 700. By providing controls for selecting from multiple different types of tasks that may be performed by a team, for example, the performance monitoring interface 700 can be used to more effectively manage portions of a team (e.g., a portion of the team that performs a particular type of task), and/or the performance of particular types of tasks.

The performance monitoring interface 700 for storage and retrieval operations, for example, includes a pick volume by team control 704 that presents, for each different type of carton picked by the storage and retrieval team 120b in the warehouse environment 100 (e.g., conveyable bulk, conveyable carton air, conveyable carton floor, and conveyable full pallet), a view of actual work progress of the storage and retrieval team relative predicted work progress. In the present example, at the end of the first period, the storage and retrieval team 120b has overproduced with respect to all carton types, and corresponding alerts can be presented for notifying an operations manager, so that the operations manager can identify possible causes of the overproduction, and can possibly provide related information. The performance monitoring interface 700 also includes a storage and retrieval plan control 720 (e.g., a "pick" plan control) that plots, along a time axis for the shift (e.g., from 6:00 to 18:00), a first graphical indicator that represents a cumulative number of cartons that had been planned to be picked by the storage and retrieval team 120b, and a second graphical indicator that represents a cumulative number of cartons that have actually been picked by the team. In the present example, the storage and retrieval plan control 720 shows that at the end of the first and second periods (e.g., 10:00 and 14:00), the storage and retrieval team 120b had been overproducing relative its pick plan, but that the rate of production had then decreased to track closer to the plan.

Figure 8:
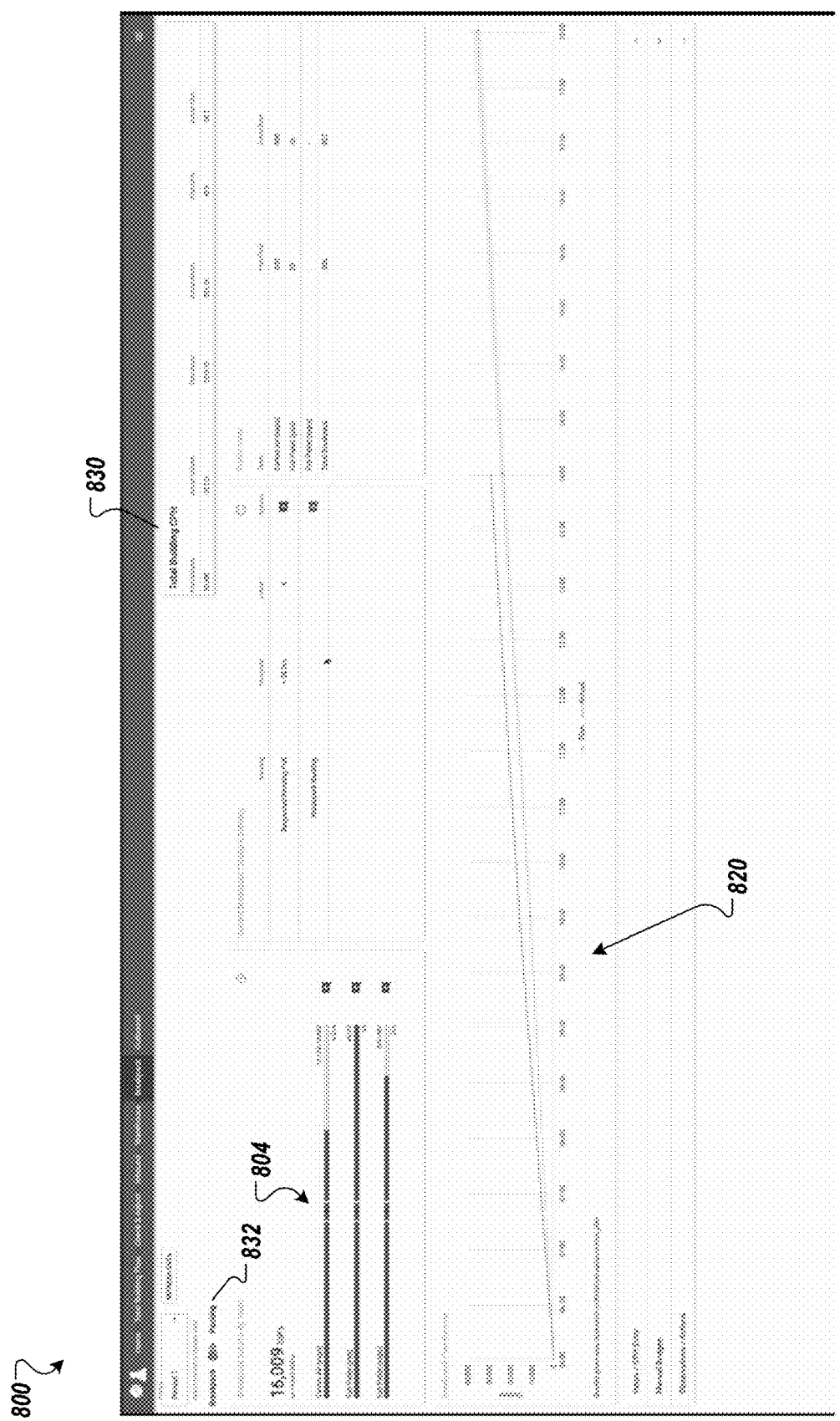
FIG. 8 depicts an example performance monitoring interface for sortation operations.

Referring now to FIG. 8, an example performance monitoring interface 800 for sortation operations is shown. The performance monitoring interface 800 for sortation operations, for example, can be used to compare actual work progress of the sortation team 120c during a shift according to real-time data, relative to predicted work progress for the sortation team according to simulation output data. Similar to performance monitoring interfaces 600a (shown in FIG. 6A) and 700 (shown in FIG. 7), for example, the performance monitoring interface 800 can include a time period selection control for selecting a time period of a shift, one or more presentation controls that present views of actual work progress compared to predicted work progress for the shift (e.g., for the sortation team 120c), and graphical indicators that plot, along a time axis, a cumulative amount of work tasks that had been predicted to performed according a task simulation, relative to a cumulative amount of work tasks that have actually been performed (e.g., by the sortation team 120c). Also similar to performance monitoring interfaces 600a and 700, for example, the performance monitoring interface 800 can provide alerts when an amount of tasks that have been performed according to the real-time warehouse data is outside of a predetermined variance for an amount of tasks that had been predicted to be performed according to the task simulation (e.g., for the sortation team 120c), can provide one or more controls for receiving operator information with respect to the alerts, and can collect provided information over the shift.

The performance monitoring interface 800 for sortation operations, for example, includes a task type selection control 832 through which an operations manager can select a type of task that can be performed by the sortation team 120c. The sortation team 120c (or respective portions of the sortation team 120c), for example, can perform sotation tasks (e.g., unpacking goods from containers) and packing tasks (e.g., packing goods into containers). In response to receiving a task type selection through the task type selection control 832, for example, the performance monitoring interface 800 can be updated to present information (e.g., based on data that compares actual work task progress relative to predicted work task progress) relevant to the selected task type. In the present example, a task type selection of "breakpack" has been made, and information related to simulated and actual breakpack (e.g., unpacking) tasks performed by sortation team 120c is presented by the performance monitoring interface 800. By providing controls for selecting between breakpack and packing tasks, for example, the performance monitoring interface 700 can be used to more effectively manage portions of the sortation team 120*c* that perform the respective tasks, and/or the performance of the tasks.

The performance monitoring interface 800 for sortation operations, for example, includes a breakpack volume by team control 804 that presents, for each different type of container unpacked by the sortation team 120*c* in the warehouse environment 100 (e.g., carton air, full pallet (PLTS), and full pallet (SSPS)), a view of actual work progress of the sortation team relative predicted work progress. In the present example, at the end of the first period, the sortation team 120*c* has overproduced with respect to all container types, and corresponding alerts can be presented for notifying an operations manager, so that the operations manager can identify possible causes of the overproduction, and can possibly provide related information. The performance monitoring interface 800 also includes a sortation plan control 820 that plots, along a time axis for the shift (e.g., from 6:00 to 18:00), a first graphical indicator that represents a cumulative number of containers that had been planned to be unpacked by the sortation team 120*c*, and a second graphical indicator that represents a cumulative number of containers that have actually been unpacked by the team. In the present example, the sortation plan control 820 shows that the sortation team 120*c* has been overproducing relative its sortation plan throughout the shift.

Figure 9:
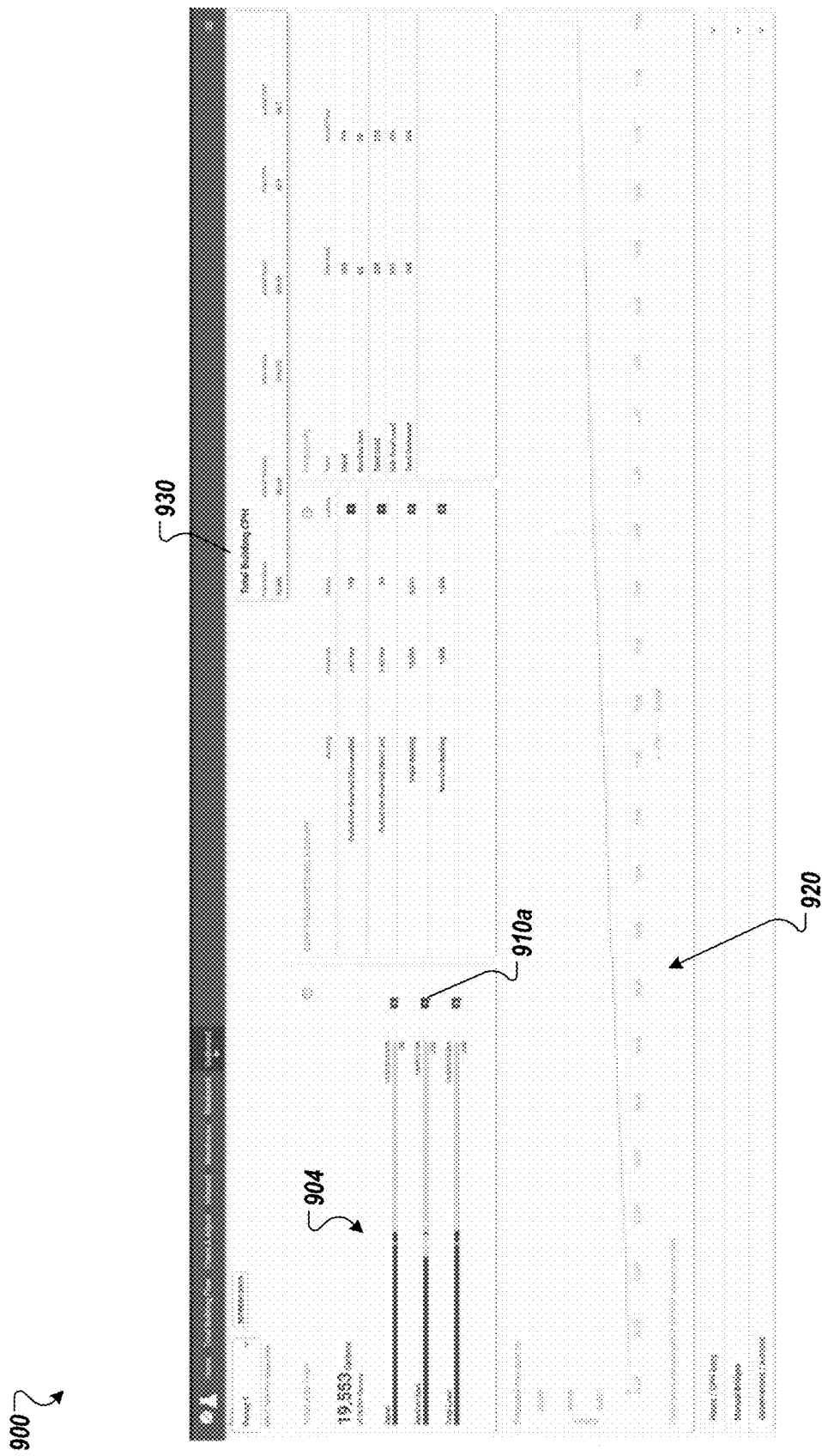
FIG. 9 depicts an example performance monitoring interface for shipping operations.

Referring now to FIG. 9, an example performance monitoring interface 900 for shipping operations is shown. The performance monitoring interface 900 for shipping operations, for example, can be used to compare actual work progress of the shipping team 120*d* during a shift according to real-time data, relative to predicted work progress for the shipping team according to simulation output data. Similar to performance monitoring interfaces 600*a* (shown in FIG. 6A), 700 (shown in FIG. 7), and 800 (shown in FIG. 8), for example, the performance monitoring interface 900 can include a time period selection control for selecting a time period of a shift, one or more presentation controls that present views of actual work progress compared to predicted work progress for the shift (e.g., for the shipping team 120*d*), and graphical indicators that plot, along a time axis, a cumulative amount of work tasks that had been predicted to be performed according a task simulation, relative to a cumulative amount of work tasks that have actually been performed (e.g., by the shipping team 120*d*). Also similar to performance monitoring interfaces 600*a*, 700, and 800, for example, the performance monitoring interface 900 can provide alerts when an amount of tasks that have been performed according to the real-time warehouse data is outside of a predetermined variance for an amount of tasks that had been predicted to be performed according to the task simulation (e.g., for the shipping team 120*d*), can provide one or more controls for receiving operator information with respect to the alerts, and can collect provided information over the shift.

The performance monitoring interface 900 for shipping operations, for example, includes a volume by team control 904 that presents, for each different type of task performed by the shipping team 120*d* in the warehouse environment 100 (e.g., depalletizing tasks, non-conveyable sorting tasks, total loading tasks, etc.), a view of actual work progress of the shipping team relative predicted work progress. In the present example, at the end of the first period, the shipping team 120*d* has performed according to its plan with respect to depalletizing tasks and total loading tasks, however has underperformed with respect to non-conveyable sorting tasks. Thus, in the present example, an alert 910*a* can be presented that corresponds to the non-conveyable sorting tasks, so that an operations manager can be notified of the underproduction, can identify possible causes of the underproduction, and can possibly provide related information. The performance monitoring interface 900 also includes a shipping plan control 920 that plots, along a time axis for the shift (e.g., from 6:00 to 18:00), a first graphical indicator that represents a cumulative number of work tasks that had been planned to be performed by the shipping team 120*d*, and a second graphical indicator that represents a cumulative number of work tasks that have actually been performed by the team. In the present example, the shipping plan control 920 shows that the shipping team 120*d* has been mainly performing according to its plan throughout the shift.

In some implementations, a performance monitoring interface may present information related to aggregated overall actual performance of multiple different teams, relative to the simulated work plans. For example, each of the performance monitoring interfaces 600*a* (shown in FIG. 6A), 700 (shown in FIG. 7), 800 (shown in FIG. 8), and 900 (shown in FIG. 9) can include respective total performance controls 630, 730, 830, and 930, each total performance control providing information related to a total performance across the teams 120*a-d* over the shift. In the present example, each of the total performance controls 630, 730, 830, and 930 presents a total number of cartons processed according to the overall simulated work plan, an actual number of cartons processed, a number of planned work hours, a number of actual work hours, a number of processed cases per hour according to the work plan, and an actual number of cases per hour. Through the total performance controls 630, 730, 830, and 930, for example, the respective operations managers of the respective teams 120*a-d* can be informed about progress according to the overall work plan during the shift.

Figure 10:
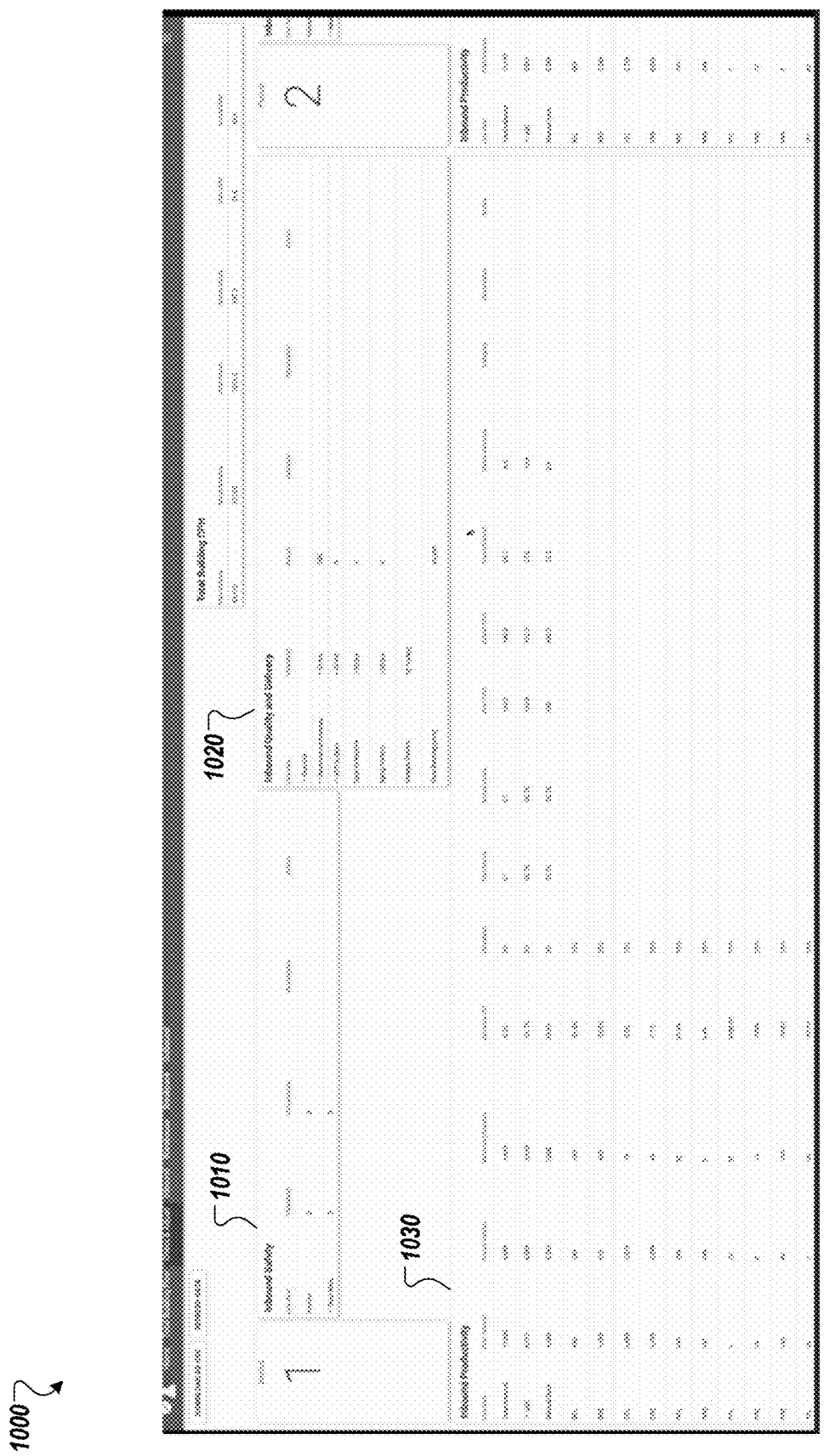
FIG. 10 depicts an example performance monitoring interface for a check and adjust session.

Referring now to FIG. 10, an example performance monitoring interface 1000 for a check and adjust session is shown. The performance monitoring interface 1000, for example, can aggregate data related to simulated work plans and data related to actual work task performance, across multiple different teams, into an aggregated presentation. In the present example, the performance monitoring interface 1000 includes information from the performance monitoring interface 600*a* for receiving operations (shown in FIG. 6A), the performance monitoring interface 700 for storage and retrieval operations (shown in FIG. 7), the performance monitoring interface 800 for sortation operations (shown in FIG. 8), and the performance monitoring interface 900 for shipping operations (shown in FIG. 9). For example, the performance monitoring interface 1000 can include multiple different information presentation controls, such as a safety information presentation control 1010, a quality information presentation control 1020, and a productivity information presentation control 1030. The safety information presentation control 1010, for example, can present information related to injuries, near-misses, and other safety-related incidents that may have occurred during a shift. The quality information presentation control 1020, for example, can present quality-related information with respect to planned and performed work tasks during the shift. The productivity information presentation control 1030, for example, can present productivity-related information with respect to planned and performed work tasks during the shift. Each of the information presentation controls 1010, 1020, and 1030, for example, can be repeated for presenting information related to the receiving team 120*a*, the storage and retrieval team 120*b*, the sortation team 120*c*, and the shipping team 120*d*. The performance monitoring interface 1000, for example, can also present information provided by operations managers through controls of the performance monitoring interfaces 600*a*, 700, 800, and 900. During each of the check & adjust periods 146*a-b*, and during the end of shift recap period 146*c*, for example, operations managers of the respective teams 120*a-d* can meet, and can refer to the performance monitoring interface 1000 while communicating about how to possibly adjust operations (e.g., by reallocating resources) to better perform work tasks according to plan while running a balanced, quality, safe operation across the teams, and to collaboratively solve problems that may occur in the warehouse environment 100.

Figure 11:
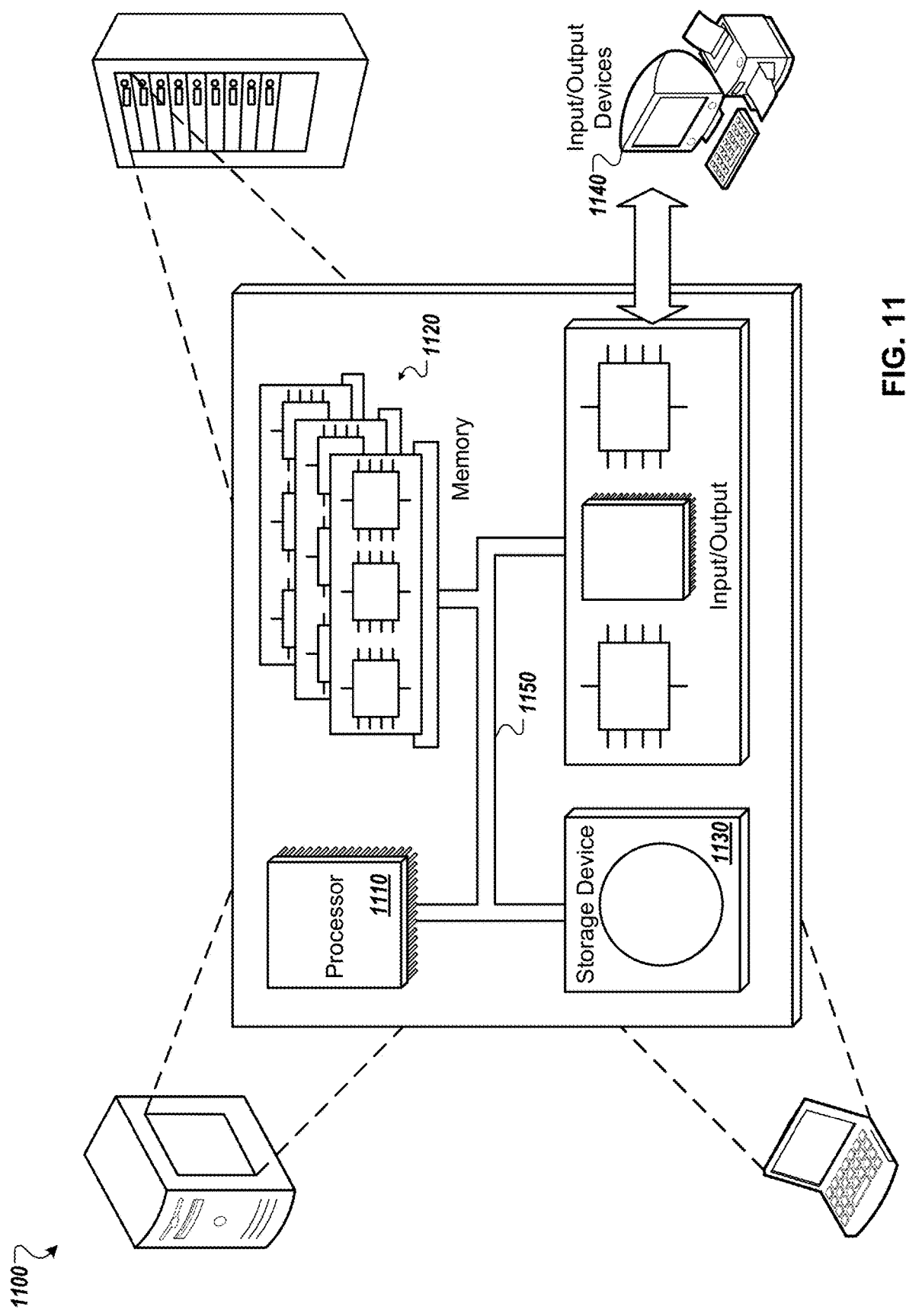
FIG. 11 is a schematic diagram that shows an example of a computing system.

FIG. 11 is a schematic diagram that shows an example of a computing system 1100. The computing system 1100 can be used for some or all of the operations described previously, according to some implementations. The computing system 1100 includes a processor 1110, a memory 1120, a storage device 1130, and an input/output device 1140. Each of the processor 1110, the memory 1120, the storage device 1130, and the input/output device 1140 are interconnected using a system bus 1150. The processor 1110 is capable of processing instructions for execution within the computing system 1100. In some implementations, the processor 1110 is a single-threaded processor. In some implementations, the processor 1110 is a multi-threaded processor. The processor 1110 is capable of processing instructions stored in the memory 1120 or on the storage device 1130 to display graphical information for a user interface on the input/output device 1140.

The memory 1120 stores information within the computing system 1100. In some implementations, the memory 1120 is a computer-readable medium. In some implementations, the memory 1120 is a volatile memory unit. In some implementations, the memory 1120 is a non-volatile memory unit.

The storage device 1130 is capable of providing mass storage for the computing system 1100. In some implementations, the storage device 1130 is a computer-readable medium. In various different implementations, the storage device 1130 may be a floppy disk device, a hard disk device, an optical disk device, or a tape device.

The input/output device 1140 provides input/output operations for the computing system 1100. In some implementations, the input/output device 1140 includes a keyboard and/or pointing device. In some implementations, the input/output device 1140 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computer-implemented method comprising:
providing, by a warehouse coordination system and to a client device, data for presentation of a plan creation interface for a warehouse process, wherein the plan creation interface presents (i) one or more controls for selecting and sequencing tasks to be performed over a shift for the warehouse process, (ii) one or more controls for applying resources that are available for performing the tasks, and (iii) one or more controls for executing a simulation of the tasks to be performed;

receiving, by the warehouse coordination system and through the plan creation interface presented by the client device, (i) a defined sequence of the tasks to be performed over the shift for the warehouse process, (ii) defined resources to be applied to the tasks, and (iii) a command to execute the simulation of the tasks;

in response to receiving the command to execute the simulation of the tasks, executing, by the warehouse coordination system, the simulation of the tasks to be performed over the shift for the warehouse process, according to the defined sequence of the tasks and the defined resources to be applied to the tasks;

generating, by the warehouse coordination system, simulation output data based on the simulation of the tasks to be performed;

storing, by the warehouse coordination system, data that represents the defined sequence of the tasks to be performed, data that represents the defined resources to be applied to the tasks, and the simulation output data based on the simulation of the tasks to be performed;

receiving, by the warehouse coordination system and from data collection devices in a warehouse environment, real-time warehouse data that indicates the tasks being performed over the shift for the warehouse process;

providing, by the warehouse coordination system and to the client device, data for presentation of a performance monitoring interface for the warehouse process, wherein the performance monitoring interface presents, for each time period of a series of consecutive time periods that occur over the course of the shift, an amount of tasks that have been predicted to be performed according to the simulation of the tasks, in comparison to an amount of tasks that have been performed according to the real-time warehouse data;

receiving, by the warehouse coordination system and through one or more input controls of the performance monitoring interface presented by the client device, data that specifies an event that has occurred during the shift and that has impacted performance of the tasks;

in response to receiving the data that indicates the event that has occurred during the shift, (i) determining, by the warehouse coordination system, that the event is represented in a knowledge base that correlates events with deviations between predicted and actual task performance, (ii) executing an updated simulation of the tasks that are yet to be performed over the remaining portion of the shift, wherein executing the updated simulation includes adjusting a predicted performance of the tasks that are yet to be performed, according to an adjustment factor that is correlated with the event, and (iii) for the remaining portion of the shift, updating the performance monitoring interface to present an updated amount of tasks that have been predicted to be performed according to the updated simulation of the tasks, in comparison to the amount of tasks that have been performed according to the real-time warehouse data; and after the shift has occurred, updating the knowledge base to include an updated correlation between the event and an updated deviation between predicted and actual task performance, based on data that represents actual task performance relative to predicted task performance over the shift.

2. The computer-implemented method of claim 1, wherein executing the simulation of the tasks to be performed over the shift for the warehouse process includes modeling the tasks to be performed according to the defined sequence of the tasks over time, using a collection of state variables that represent workers and containers in a warehouse.

3. The computer-implemented method of claim 1, wherein the real-time warehouse data includes, for each task that has been performed, one or more task identifiers, and a timestamp that indicates a time at which the task has been performed.

4. The computer-implemented method of claim 1, wherein the performance monitoring interface includes a first graphical indicator that plots, along a time axis, a cumulative amount of tasks that have been predicted to be performed according to the simulation of the tasks, and a second graphical indicator that plots, along the time axis, a cumulative amount of tasks that have been performed according to the real-time warehouse data.

5. The computer-implemented method of claim 4, wherein the first graphical indicator represents a predetermined variance for the cumulative amount of tasks that have been predicted to be performed according to the simulation of the tasks.

6. The computer-implemented method of claim 1, wherein the performance monitoring interface presents an alert when the amount of tasks that have been performed according to the real-time warehouse data is outside of a predetermined variance for the amount of tasks that have been predicted to be performed according to the simulation of the tasks.

7. The computer-implemented method of claim 6, wherein the performance monitoring interface provides an input mechanism for providing operator information when the amount of tasks that have been performed according to the real-time warehouse data is outside of the predetermined variance for the amount of tasks that have been predicted to be performed according to the simulation of the tasks.

8. A computer system comprising:
one or more data processing apparatuses including one or more processors, memory, and storage devices storing instructions that, when executed, cause the one or more processors to perform operations comprising:
providing, by a warehouse coordination system and to a client device, data for presentation of a plan creation interface for a warehouse process, wherein the plan creation interface presents (i) one or more controls for selecting and sequencing tasks to be performed over a shift for the warehouse process, (ii) one or more controls for applying resources that are available for performing the tasks, and (iii) one or more controls for executing a simulation of the tasks to be performed;
receiving, by the warehouse coordination system and through the plan creation interface presented by the client device, (i) a defined sequence of the tasks to be performed over the shift for the warehouse process, (ii) defined resources to be applied to the tasks, and (iii) a command to execute the simulation of the tasks;
in response to receiving the command to execute the simulation of the tasks, executing, by the warehouse coordination system, the simulation of the tasks to be performed over the shift for the warehouse process, according to the defined sequence of the tasks and the defined resources to be applied to the tasks;

generating, by the warehouse coordination system, simulation output data based on the simulation of the tasks to be performed;

storing, by the warehouse coordination system, data that represents the defined sequence of the tasks to be performed, data that represents the defined resources to be applied to the tasks, and the simulation output data based on the simulation of the tasks to be performed;

receiving, by the warehouse coordination system and from data collection devices in a warehouse environment, real-time warehouse data that indicates the tasks being performed over the shift for the warehouse process;

providing, by the warehouse coordination system and to the client device, data for presentation of a performance monitoring interface for the warehouse process, wherein the performance monitoring interface presents, for each time period of a series of consecutive time periods that occur over the course of the shift, an amount of tasks that have been predicted to be performed according to the simulation of the tasks, in comparison to an amount of tasks that have been performed according to the real-time warehouse data;

receiving, by the warehouse coordination system and through one or more input controls of the performance monitoring interface presented by the client device, data that specifies an event that has occurred during the shift and that has impacted performance of the tasks;

in response to receiving the data that indicates the event that has occurred during the shift, (i) determining, by the warehouse coordination system, that the event is represented in a knowledge base that correlates events with deviations between predicted and actual task performance, (ii) executing an updated simulation of the tasks that are yet to be performed over the remaining portion of the shift, wherein executing the updated simulation includes adjusting a predicted performance of the tasks that are yet to be performed, according to an adjustment factor that is correlated with the event, and (iii) for the remaining portion of the shift, updating the performance monitoring interface to present an updated amount of tasks that have been predicted to be performed according to the updated simulation of the tasks, in comparison to the amount of tasks that have been performed according to the real-time warehouse data; and after the shift has occurred, updating the knowledge base to include an updated correlation between the event and an updated deviation between predicted and actual task performance, based on data that represents actual task performance relative to predicted task performance over the shift.

9. The computer system of claim 8, wherein executing the simulation of the tasks to be performed over the shift for the warehouse process includes modeling the tasks to be performed according to the defined sequence of the tasks over time, using a collection of state variables that represent workers and containers in a warehouse.

10. The computer system of claim 8, wherein the real-time warehouse data includes, for each task that has been performed, one or more task identifiers, and a timestamp that indicates a time at which the task has been performed.

11. The computer system of claim 8, wherein the performance monitoring interface includes a first graphical indicator that plots, along a time axis, a cumulative amount of tasks that have been predicted to be performed according to the simulation of the tasks, and a second graphical indicator that plots, along the time axis, a cumulative amount of tasks that have been performed according to the real-time warehouse data.

12. The computer system of claim 11, wherein the first graphical indicator represents a predetermined variance for the cumulative amount of tasks that have been predicted to be performed according to the simulation of the tasks.

13. The computer system of claim 8, wherein the performance monitoring interface presents an alert when the amount of tasks that have been performed according to the real-time warehouse data is outside of a predetermined variance for the amount of tasks that have been predicted to be performed according to the simulation of the tasks.

14. The computer system of claim 13, wherein the performance monitoring interface provides an input mechanism for providing operator information when the amount of tasks that have been performed according to the real-time warehouse data is outside of the predetermined variance for the amount of tasks that have been predicted to be performed according to the simulation of the tasks.

15. A non-transitory computer-readable storage medium coupled to one or more processors and having instructions stored thereon which, when executed by the one or more processors, cause the one or more processors to perform operations comprising:

providing, by a warehouse coordination system and to a client device, data for presentation of a plan creation interface for a warehouse process, wherein the plan creation interface presents (i) one or more controls for selecting and sequencing tasks to be performed over a shift for the warehouse process, (ii) one or more controls for applying resources that are available for performing the tasks, and (iii) one or more controls for executing a simulation of the tasks to be performed;

receiving, by the warehouse coordination system and through the plan creation interface presented by the client device, (i) a defined sequence of the tasks to be performed over the shift for the warehouse process, (ii) defined resources to be applied to the tasks, and (iii) a command to execute the simulation of the tasks;

in response to receiving the command to execute the simulation of the tasks, performing executing, by the warehouse coordination system, the simulation of the tasks to be performed over the shift for the warehouse process, according to the defined sequence of the tasks and the defined resources to be applied to the tasks;

generating, by the warehouse coordination system, simulation output data based on the simulation of the tasks to be performed;

storing, by the warehouse coordination system, data that represents the defined sequence of the tasks to be performed, data that represents the defined resources to be applied to the tasks, and the simulation output data based on the simulation of the tasks to be performed;

receiving, by the warehouse coordination system and from data collection devices in a warehouse environment, real-time warehouse data that indicates the tasks being performed over the shift for the warehouse process;

providing, by the warehouse coordination system and to the client device, data for presentation of a performance monitoring interface for the warehouse process, wherein the performance monitoring interface presents, for each time period of a series of consecutive time periods that occur over the course of the shift, an amount of tasks that have been predicted to be performed according to the simulation of the tasks, in comparison to an amount of tasks that have been performed according to the real-time warehouse data;

receiving, by the warehouse coordination system and through one or more input controls of the performance monitoring interface presented by the client device, data that specifies an event that has occurred during the shift and that has impacted performance of the tasks;

in response to receiving the data that indicates the event that has occurred during the shift, (i) determining, by the warehouse coordination system, that the event is represented in a knowledge base that correlates events with deviations between predicted and actual task performance, (ii) executing an updated simulation of the tasks that are yet to be performed over the remaining portion of the shift, wherein executing the updated simulation includes adjusting a predicted performance of the tasks that are yet to be performed, according to an adjustment factor that is correlated with the event, and (iii) for the remaining portion of the shift, updating the performance monitoring interface to present an updated amount of tasks that have been predicted to be performed according to the updated simulation of the tasks, in comparison to the amount of tasks that have been performed according to the real-time warehouse data; and after the shift has occurred, updating the knowledge base to include an updated correlation between the event and an updated deviation between predicted and actual task performance, based on data that represents actual task performance relative to predicted task performance over the shift.

16. The non-transitory computer-readable storage medium of claim 15, wherein executing the simulation of the tasks to be performed over the shift for the warehouse process includes modeling the tasks to be performed according to the defined sequence of the tasks over time, using a collection of state variables that represent workers and containers in a warehouse.

17. The non-transitory computer-readable storage medium of claim 15, wherein the real-time warehouse data includes, for each task that has been performed, one or more task identifiers, and a timestamp that indicates a time at which the task has been performed.

18. The non-transitory computer-readable storage medium of claim 15, wherein the performance monitoring interface includes a first graphical indicator that plots, along a time axis, a cumulative amount of tasks that have been predicted to be performed according to the simulation of the tasks, and a second graphical indicator that plots, along the time axis, a cumulative amount of tasks that have been performed according to the real-time warehouse data.

19. The non-transitory computer-readable storage medium of claim 15, wherein the performance monitoring interface presents an alert when the amount of tasks that have been performed according to the real-time warehouse data is outside of a predetermined variance for the amount of tasks that have been predicted to be performed according to the simulation of the tasks.

* * * * *